(12) United States Patent
Dupont et al.

(10) Patent No.: US 8,586,523 B2
(45) Date of Patent: Nov. 19, 2013

(54) SULFONATE GROUP-CONTAINING COPOLYMERS AND MANUFACTURING METHOD THEREOF

(75) Inventors: Jeffrey Scott Dupont, Cincinnati, OH (US); Atsuro Yoneda, Osaka (JP); Akiko Hemmi, Osaka (JP)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 13/061,525

(22) PCT Filed: Sep. 1, 2009

(86) PCT No.: PCT/JP2009/065556
§ 371 (c)(1),
(2), (4) Date: Jun. 22, 2011

(87) PCT Pub. No.: WO2010/024468
PCT Pub. Date: Mar. 4, 2010

(65) Prior Publication Data
US 2011/0245132 A1 Oct. 6, 2011

(30) Foreign Application Priority Data
Sep. 1, 2008 (JP) .................................. 2008-223234

(51) Int. Cl.
*C11D 3/37* (2006.01)
*C11D 1/12* (2006.01)

(52) U.S. Cl.
USPC ........... 510/475; 510/276; 510/346; 510/351; 510/426; 8/137

(58) Field of Classification Search
USPC ............... 510/276, 346, 351, 426, 475; 8/137
See application file for complete search history.

(56) References Cited

U.S. PATENT DOCUMENTS 4,618,448 A * 10/1986 Cha et al. ..................... 252/180
4,618,488 A    10/1986 Maeyama et al.

FOREIGN PATENT DOCUMENTS

| EP | 0184894 A1 | 6/1986 |
| EP | 798320 | * 10/1997 |
| JP | 9255740 A | 9/1997 |
| WO | WO 99/05243 | * 2/1999 |
| WO | WO 2010/024468 | 3/2010 |

OTHER PUBLICATIONS

European Search Report, dated May 6, 2013, containing 5 pages.

* cited by examiner

*Primary Examiner* — Brian P Mruk
(74) *Attorney, Agent, or Firm* — Melissa G Krasovec

(57) ABSTRACT

[Problem] To provide detergent compositions with superior surfactant deposition-inhibiting ability and anti-gelling properties that exhibit good cleaning effectiveness even when laundering under harsh conditions such as laundering in residual bath water. [Solution] A laundry detergent or cleaning composition which comprises a copolymer containing sulfonate groups containing from 1 to 50 mass percent of structural units (a) derived from 1 or more kinds of monomers (A) selected from ether bond-containing monomers represented by Formulas (1) and (2), 50 mass % or more and less than 98 mass % of structural units (b) derived from a carboxyl group-containing monomer (B), and 1 mass % or more and less than 50 mass % of structural units (c) de-rived from a sulfonate group-containing monomer (C).

8 Claims, No Drawings

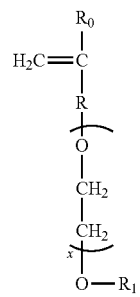

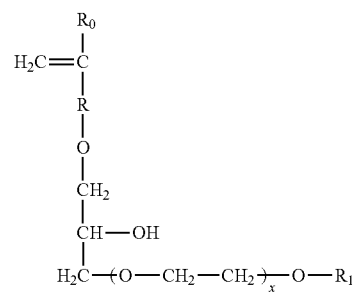

SULFONATE GROUP-CONTAINING COPOLYMERS AND MANUFACTURING METHOD THEREOF

TECHNICAL FIELD

The present invention pertains to sulfonate group-containing copolymers and a manufacturing method thereof.

BACKGROUND ART

In the past, detergent builders (detergent assistants) such as zeolite, carboxymethylcellulose or polyethylene glycol were blended into detergents that were used for clothing for the purpose of improving the cleaning effectiveness of detergents.

In addition to the various detergent builders above, polymers have been blended as builders into detergent compositions in recent years.

For example, using copolymers of acrylate and sodium 3-allyloxy-2-hydroxy-1-propane sulfonate, wherein at least one of the main chain terminals has sulfonate groups, as a detergent builder has been disclosed (Patent Reference 1).

As for capabilities that are required of detergent builders, the ability to improve the cleaning power of the detergent is obvious. But at present, the ability to inhibit/prevent deposition of surfactants (also called simply "deposition-inhibiting ability" below), which leads to reduction of cleaning power, is also required. Here, the problem of surfactant deposition is pronounced when laundering using relatively hard water because it occurs as a result of straight-chain alkylbenzenesulfonic acids (salts) (LAS) such as dodecylbenzenesulfonic acids (salts), which are anionic surfactants binding with calcium ions or magnesium ions present in the water (see Non-patent Reference 1).

For technology to improve the deposition-inhibiting ability, Patent Reference 2 can be cited. Patent Reference 2 indicates that graft polymers made by graft polymerizing prescribed amounts of acid group-containing unsaturated monomers with polyoxyalkylene compounds containing hydrocarbon groups exhibit superior abilities as detergent builders.

Due to increased consumer awareness of environmental issues in recent years, new laundering styles, such as consumers conserving water by using residual bath water for laundry, are starting to be established. Along with this, the abilities required of detergent builders are also changing. That is, due to the use of residual bath water, the problem emerges that laundry must be done under very hard conditions as a result of the concentration of calcium components. By this, agents with even higher so-called anti-gelling property than was required in the past that inhibit deposition even under laundering conditions of high hardness and that are effective are required.

From the demand for compacting detergent compositions, the demand for providing multiple, required abilities together in 1 component is also increasing.

CITATION LIST

Patent Literature

[PTL 1] Japanese Patent Publication (Kokai) No. 2002-3535
[PTL 1] Japanese Patent Publication (Kokai) No. 2007-254679

Non-Patent Literature

[NPL 1] Louis Ho Tan Tai, "Formulating Detergents and Personal Care Products," AOCS Press, pp. 53-54 (2000)

SUMMARY OF THE INVENTION

Technical Problem

As stated above, despite various polymers being reported in the past, the reality was that polymers that exhibited satisfactory deposition-inhibiting ability when used for laundry did not exist. Consequently, the present invention was made in view of the above circumstances and has the objective of providing polymers (or polymer compositions) that can effectively inhibit surfactant deposition when used for laundry.

Another objective of the present invention is to provide a method that can manufacture such polymers (or polymer compositions) efficiently.

Solution Problem

Upon performing diligent studies of various polymers/copolymers to achieve the above objective, the inventors learned that copolymers (sulfonate group-containing copolymers) wherein structural units derived from specific ether bond-containing monomers that are relatively hydrophobic, structural units of carboxyl group-containing monomers, and structural units derived from sulfonate group-containing monomers that have been introduced in specified proportions have superior deposition-inhibiting ability (ability to inhibit/prevent deposition of surfactants). The present invention was completed based on the above knowledge.

That is, the present invention concerns copolymers containing sulfonate groups comprising 1 mass % or more and less than 50 mass % of structural units (a) derived from 1 or more kinds of monomers (A) selected from ether bond-containing monomers represented by Formulas (1) and (2),

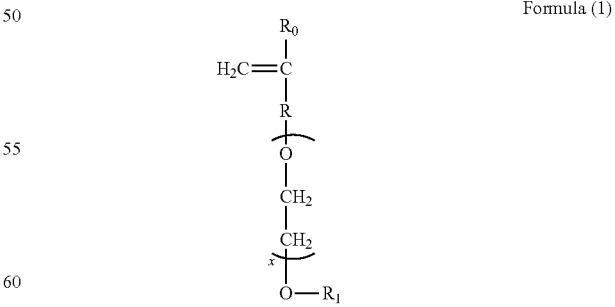

Formula (1)

in the formula, $R_0$ represents a hydrogen atom or $CH_3$ group, R represents a $CH_2$ group, $CH_2CH_2$ group or single bond, X represents a number 0-5 (provided X represents a number 1-5 when R is a single bond), and $R_1$ is a hydrogen atom or C1 to C20 organic group, Formula (2)

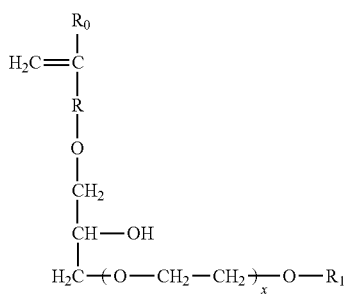

in the formula, $R_0$ represents a hydrogen atom or $CH_3$ group, R represents a $CH_2$ group, $CH_2CH_2$ group or single bond, X represents a number 0-5, and $R_1$ is a hydrogen atom or C1 to C20 organic group;

50 mass % or more and less than 98 mass % of structural units (b) derived from a carboxyl group-containing monomers (B);

and 1 mass % or more and less than 50 mass % of structural units (c) derived from a sulfonate group-containing monomers (C) as requisite constituent units.

Advantageous Effects of Invention

Because the sulfonate group-containing copolymers of the present invention (or polymer compositions of the present invention) exhibit superior deposition-inhibiting ability (the ability to inhibit/prevent surfactant deposition), surfactant deposition is effectively inhibited if the sulfonate group-containing copolymers of the present invention are used in detergent compositions.

DESCRIPTION OF EMBODIMENTS

The present invention is explained in detail below.

In the Description, "Cx to Cy organic group" (x and y each represents a number) means an organic group having x to y carbon atoms, and it is also called "x- to y-carbon organic group".

Sulfonate Group-Containing Copolymers of the Present Invention

Ether Bond-Containing Monomers

It is necessary that the sulfonate group-containing copolymers of the present invention comprise structural units (a) derived from 1 or more monomers (A) selected from ether bond-containing monomers represented by Formula (1) and (2) below.

Formula (1)

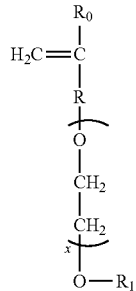

in Formula (1), $R_0$ represents a hydrogen atom or $CH_3$ group, R represents a $CH_2$ group, $CH_2CH_2$ group or single bond, X represents a number 0-5 (provided X represents a number 1-5 when R is a single bond), and $R_1$ is a hydrogen atom or 1- to 20-carbon organic group, Formula (2)

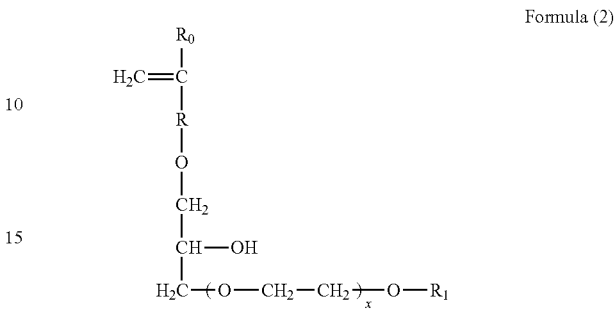

in the formula, $R_0$ represents a hydrogen atom or $CH_3$ group, R represents a $CH_2$ group, $CH_2CH_2$ group or single bond, X represents a number 0-5, and $R_1$ is a hydrogen atom or 1- to 20-carbon organic group.

In Formula (1), it is preferable that R is a $CH_2CH_2$ group because high improvement of the deposition-inhibiting ability of the copolymer is obtained. In (2), it is preferable that R is a $CH_2$ group because high improvement of the deposition-inhibiting ability of the copolymer is obtained.

In Formulas (1) and (2), $R_1$ is a hydrogen atom or 1- to 20-carbon organic group as stated above. It is preferable that $R_1$ is a 4- to 18-carbon organic group and more preferable that it is a 6- to 16-carbon organic group. $R_1$ can contain functional groups such as amino groups, amide groups, hydroxyl groups, alkoxide groups, sulfonate groups, carbonyl groups or carboxyl groups. $R_1$ can contain ether bonds or sulfide bonds, ester bonds, or amide bonds. Alkyl groups, aryl groups and alkenyl groups are preferable for the organic group because high improvement of the deposition-inhibiting ability of the copolymer is obtained.

For favorable $R_1$, concretely, alkyl groups such as n-butyl groups, isobutyl groups, octyl groups, lauryl groups, stearyl groups, cyclohexyl groups, and 2-ethylhexyl groups; alkenyl groups such as butylene groups, octylene groups and nonylene groups; aryl groups such as phenyl groups, phenethyl groups, 2,3- or 2,4-xylyl groups, mesityl groups or naphthyl groups can be cited.

For monomers of Formula (1), compounds represented by Formulas (3)-(7) below can be listed as favorable compounds. It is preferable that compounds represented by Formulas (3)-(7) are manufactured by reacting allyl alcohol or isoprenol with the corresponding 1) alkyl halide, 2) epoxy compound, 3) glycidyl compound, 4) ester compound, or 5) isocyanate compound.

Formula (3)

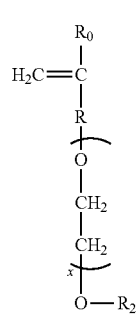

-continued

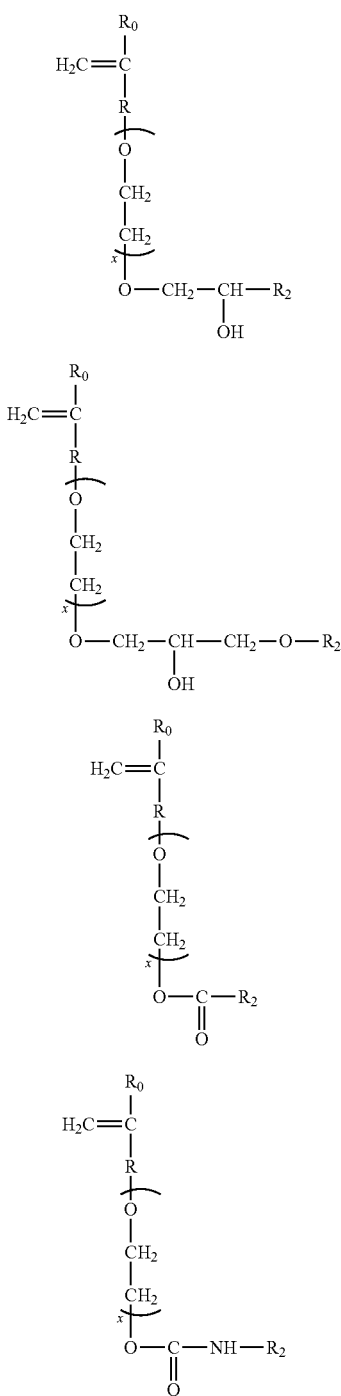

Formula (4)

Formula (5)

Formula (6)

Formula (7)

In Formulas (3)-(7), $R_0$ represents a hydrogen atom or $CH_3$ group, R and X are the same as in Formula (1), and $R_2$ represents 1- to 20-carbon alkyl groups, alkenyl groups or aryl groups.

For monomers of Formula (2), compounds represented by Formulas (8) and (9) below can be listed as favorable compounds. It is preferable that the compounds represented by Formula (8) and (9) are manufactured by reacting allyl glycidyl ether with the corresponding 1) alcohol or alkylene oxide adduct thereof, or 2) amine or alkylene oxide adduct thereof.

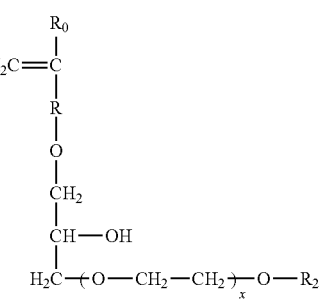

Formula (8)

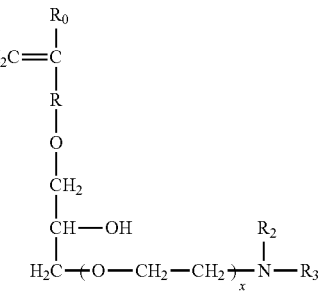

Formula (9)

In Formulas (8) and (9), $R_0$ represents a hydrogen atom or $CH_3$ group, R and X are the same as in Formula (2), and $R_2$ and $R_3$ represent 1- to 20-carbon alkyl groups, alkenyl groups or aryl groups.

Because the sulfonate group-containing copolymers of the present invention exhibit stable deposition-inhibiting ability even under alkaline conditions, it is preferable that monomers (A) do not contain ester groups or amide groups.

The above constituent units (a) have a form wherein the unsaturated double bonds ($CH_2=CH—$) in monomers (A), that is, Formula (1) or (2) above, are single bonds (—$CH_2$—$CH$—).

The sulfonate group-containing copolymers of the present invention are required to comprise structural units (a) derived from 1 or more kinds of monomers (A) that are selected from ether bond-containing monomers represented by Formulas (1) and (2) above in proportions of 1 mass % or more and less than 49 mass %, with respect to 100 mass % of the total monomer-derived structure. In the present invention, monomers refer to compounds having unsaturated double bonds (referring to carbon-carbon double bonds). If structural units (a) are within the above range, superior improvement of copolymer deposition-inhibiting ability is obtained. The proportion of structural units (a) with respect to 100 mass % of the total monomer-derived structure is preferably 2 mass % or more and less than 40 mass %, and more preferably 3 mass % or more and less than 30 mass %. By the sulfonate group-containing copolymers of the present invention comprising monomer (A)-derived structural units (a) in the above range, deposition-inhibiting ability is improved.

By introducing the relatively hydrophobic structural units (a) into the sulfonate group-containing copolymers of the present invention, the sulfonate group-containing copolymers can inhibit deposition of surfactants by increasing interaction with the surfactant. Because copolymerization with monomers (B) and (C) is relatively easy for monomer (A) even in hydrophilic solvents such as water, deposition-inhibiting ability of the sulfonate group-containing copolymers obtained can be significantly improved.

Carboxyl Group-Containing Monomers

The sulfonate group-containing copolymers of the present invention are required to comprise structural units (b) derived from carboxyl group-containing monomers (B) in specific proportions.

The carboxyl group-containing monomers (B) of the present invention are monomers that are required to comprise 1) unsaturated double bonds and 2) carboxyl groups and/or salts thereof (monomers belonging to (A) or monomers (C) are excluded from monomers (B)). Concretely, unsaturated monocarboxylic acids such as acrylic acid, methacrylic acid, crotonic acid, α-hydroxyacrylic acid, α-hydroxymethylacrylic acid and derivatives thereof and salts of these; unsaturated dicarboxylic acids such as itaconic acid, fumaric acid and maleic acid and their salts can be cited. In this case, the unsaturated dicarboxylic acid monomers need only be monomers that comprise 1 unsaturated group and 2 carboxyl groups in the molecule. Maleic acid, itaconic acid, citraconic acid, fumaric acid, etc., and their monovalent metal salts, divalent metal salts, ammonium salts and organic ammonium salts (organic amine salts), etc., or anhydrides of these are suitable. (Meth)acrylate monomers (A) can be half-esters of unsaturated dicarboxylate monomers with 1- to 22-carbon alcohols, half-amides of unsaturated dicarboxylic acids with 1- to 22-carbon amines, half-esters of unsaturated dicarboxylate monomers with 2- to 4-carbon glycols, or half-amides of maleamide acid with 2- to 4-carbon glycols.

Salts of unsaturated monocarboxylic acids and salts of unsaturated dicarboxylic acids are metal salts, ammonium salts or organic amine salts. In this case, for metal salts, monovalent metal salts of alkali metals such as sodium salts, lithium salts, potassium salts, rubidium salts, cerium salts; salts of alkaline-earth metals such as magnesium salts, calcium salts, strontium salts or barium salts; aluminum or iron salts can be cited. For organic amine salts, organic amine salts like alkanolamine salts such as monoethanolamine salts, diethanolamine salts, or triethanolamine salts; alkylamine salts such as monoethylamine salts, diethylamine salts, or trimethylamine salts; polyamines such as ethylenediamine salts or triethylenediamine salts can be cited. Of these, it is preferable that [the salts] are ammonium salts, sodium salts, or potassium salts because improvement of deposition-inhibiting ability of the copolymer obtained is high. Sodium salts are more preferable.

Among carboxyl group-containing monomers (B), acrylic acid, acrylate salts, maleic acid and maleate salts are preferable because improvement of the deposition-inhibiting ability of the copolymers obtained is high. Making acrylic acid or acrylate salts to be required is even more preferable.

The carboxyl group-containing monomer (B) can be just 1 kind. But it can also be structures derived from 2 or more kinds. In this case, the sulfonate group-containing copolymers of the present invention comprise the total of structural units (b) derived from all of the varieties of carboxyl group-containing monomers (B) in the specified proportion.

The above structural units (b) have a form wherein the unsaturated double bonds ($CH_2$=CH—) in monomers (B) are single bonds (—$CH_2$—CH—).

It is required that the sulfonate group-containing copolymers of the present invention comprise structural units (b) derived from carboxyl group-containing monomers (B) in proportions of 50 mass % or more and less than 98 mass % with respect to 100 mass % of the total monomer-derived structure. If structural units (b) are within the above range, superior improvement of the deposition-inhibiting ability of the copolymer is obtained. The proportion of structural units (b) with respect to 100 mass % of the total monomer-derived structure is preferably 52 mass % or more and less than 97 mass % and more preferably 55 mass % or more and less than 95 mass %.

Because the sulfonate group-containing copolymers of the present invention comprise structural units (b) in specific proportions, when used as detergent builders, water-solubility of the polymer becomes favorable and [they] can exhibit the effect of inhibiting deposition of surfactants that have interacted with structural units (a).

When calculating the proportion of mass (mass %) of structural units (b) derived from carboxyl group-containing monomers (B) with respect to the total monomer-derived structure in the present invention, it is calculated as the corresponding acids. For example, if it is a structural unit —$CH_2$—CH(COONa)— derived from sodium acrylate, the proportion of mass (mass %) is calculated as the structural unit —$CH_2$—CH(COOH)— derived from acrylic acid, which is the corresponding acid. Similarly, when calculating the proportion of mass (mass %) with respect to the total carboxyl group-containing monomers (B), it is calculated as the corresponding acids. For example, if it is sodium acrylate, calculation of the proportion of mass (mass %) is made as acrylic acid, which is the corresponding acid.

When calculating the proportion of mass (mass %) with respect to the total monomer-derived structures of structural units derived from acid group-containing monomers other than carboxyl group-containing monomers (B), it is calculated as the corresponding acids. When calculating the proportion of mass (mass %) with respect to total acid group-containing monomers other than carboxyl group-containing monomers (B) as well, it is calculated as the corresponding acids. Masses of amino group-containing monomer-derived structural units and amino group-containing monomers are also calculated as un-neutralized amine-derived structural units and un-neutralized amines. For example, in the case of vinylamine hydrochloride, proportion of mass (mass %) is calculated as vinylamine, which is the corresponding un-neutralized amine.

Sulfonate Group-Containing Monomers

It is necessary that the sulfonate group-containing copolymers of the present invention comprise structural units (c) derived from sulfonate group-containing monomers (C) in specified proportions.

The sulfonate group-containing monomers (C) of the present invention are monomers that must comprise 1) unsaturated double bond(s) (carbon-carbon double bonds) and 2) sulfonate group(s) (but monomers belonging to monomers (A) are excluded from monomers (C)).

For the sulfonate group-containing monomers (C) of the present invention, concretely, vinylsulfonic acid, styrenesulfonic acid, allylsulfonic acid, methallylsulfonic acid, acrylamide-2-methylpropanesulfonic acid, sodium 2-hydroxy-3-allyloxypropane sulfonate, sodium 2-hydroxy-3-methacryloxypropane sulfonate, isoprene sulfonate, sulfoethyl acrylate, sulfoethyl methacrylate, sulfopropyl acrylate, sulfopropyl methacrylate, 2-hydroxy-3-butene sulfonate, etc., and salts of these can be cited.

Among the above sulfonate group-containing monomers (C) of the present invention, sulfonate group-containing monomers that do not contain ester group or amide groups such as styrenesulfonic acid, allylsulfonic acid, methallylsulfonic acid, 2-hydroxy-3-allyloxypropanesulfonic acid, 2-hydroxy-3-methallyloxypropanesulfonic acid, isoprenesulfonic acid and salts thereof are preferable because the stability over time of the properties of the polymer obtained is high.

Among the above sulfonate group-containing monomers (C) of the present invention, 2-hydroxy-3-allyloxypropanesulfonic acid and its salts are most preferable because the properties of the polymer obtained are the most favorable. That is, structures derived from 2-hydroxy-3-allyloxypropanesulfonic acid or its salts are the most preferable for structural units (c) derived from sulfonate group-containing monomers (C) of the present invention.

Salts of the sulfonate group-containing monomers are metal salts, ammonium salts or organic amine salts. In this case, for metal salts, salts of monovalent alkali metals such as sodium salts, lithium salts, potassium salts, rubidium salts or cerium salts; salts of alkaline-earth metals such as magnesium salts, calcium salts, strontium salts, or barium salts; salts of aluminum or iron can be cited. For organic amine salts, organic amine salts like alkanolamine salts such as monoethanolamine salts, diethanolamine salts, or triethanolamine salts; alkylamine salts such as monoethylamine salts, diethylamine salts or triethylamine salts; polyamines such as ethylenediamine salts or triethylenediamine salts can be cited. Of these, ammonium salts, sodium salts and potassium salts are preferable because improvement of deposition-inhibiting abilities of the copolymers obtained is high. Sodium salts are more preferable.

The sulfonate group-containing monomer (C) can be just 1 kind. But 2 or more kinds can be used. In the present invention, there can be 1 kind of structural unit (c), or they can exist in the form of mixtures of 2 or more kinds. The above structural units (c) have a form wherein the double bonds of the vinyl groups in the corresponding sulfonate group-containing monomers (C) are single bonds ($-CH_2-CH-$).

It is necessary that the sulfonate group-containing copolymers of the present invention comprise 1 mass % or more and less than 49 mass % of the structural units (c) derived from monomers (C) with respect to 100 mass % of the total monomer-derived structure (that is, 100 mass % of the total composition of structural units (a), (b), (c) and (d)). If structural units (c) are within the above range, superior improvement of deposition-inhibiting ability of the copolymer is obtained. The proportion of structural units (c) with respect to 100 mass % of the total monomer-derived structure is preferably 2 mass % or more and less than 45 mass %, and more preferably 3 mass % or more and less than 40 mass %.

Arising from the fact that they comprise sulfonate groups derived from repeating units (c), the sulfonate group-containing copolymers of the present invention can manifest favorable improvement of dispersibility or deposition-inhibiting ability, even under conditions of high hardness. Consequently, even under harsh laundering conditions such as when laundering with residual bath water, favorable improvement of deposition-inhibiting ability can be exhibited.

Other Monomers

The sulfonate group-containing copolymers of the present invention may comprise structural units (d) derived from other monomers (D).

Other monomers (D), when the sulfonate group-containing copolymers of the present invention comprise other monomers (D), are not particularly restricted as long as they are copolymerizable with the above monomers (A)-(C) and are chosen as appropriate according to the desired effects. Concretely, N-vinyl monomers such as N-vinylpyrrolidone, N-vinyl formamide, N-vinyl acetamide, N-vinyl-N-methyl formamide, N-vinyl-N-methyl acetamide, or N-vinyl oxazolidone; amide monomers such as (meth)acrylamide, N,N-dimethyl acrylamide or N-isopropyl acrylamide; compounds wherein 6 to 200 mol ethylene oxide have been added to hydroxyl group-containing unsaturated monomers such as 3-(meth)allyloxy-1,2-dihydroxypropane, 3-allyloxy-1,2-dihydroxypropane, 3-allyl oxy-1,2-dihydroxypropane, (meth)allyl alcohol, or isoprenol (such as 3-allyloxy-1,2-di-(poly)oxyethylene ether propane), allyl ether monomers such as (meth)allyl alcohol; isoprene monomers such as isoprenol; (meth)acrylate alkyl ester monomers such as butyl(meth)acrylate, 2-ethylhexyl(meth)acrylate, or dodecyl(meth)acrylate; (meth)acrylate hydroxyalkyl monomers such as hydroxyethyl(meth)acrylate, 2-hydroxyethyl(meth)acrylate, 2-hydroxypropyl(meth)acrylate, 3-hydroxypropyl(meth)acrylate, hydroxybutyl(meth)acrylate, 2-hydroxybutyl(meth)acrylate, 4-hydroxybutyl(meth)acrylate, α-hydroxymethylethyl(meth)acrylate, hydroxypentyl(meth)acrylate, hydroxyneopentyl(meth)acrylate, hydroxyhexyl(meth)acrylate, vinyl aryl monomers such as styrene, indene or vinyl aniline, isobutylene and vinyl acetate can be cited.

1 kind of the above other monomers (D) can be used alone, or they can be used in the form of mixtures of 2 or more kinds.

For the sulfonate group-containing copolymers of the present invention, as long as the above structural units (a), (b) and (c) and, if necessary structural units (d) are introduced in the specified proportions written above, the various structural units can be present either in block form or in random form. The weight-average molecular weight of the sulfonate group-containing copolymers of the present invention can be set as appropriate and is not particularly limited. Concretely, it is preferable that the weight-average molecular weight of the sulfonate group-containing copolymer is 2000-200,000, more preferably 3000-60,000 and most preferably 4000-30,000. If the weight-average molecular weight is in the above ranges, deposition-inhibiting ability tends to improve. In this specification, weight-average molecular weight is a value measured by GPC (gel permeation chromatography). For the concrete measurement method, [weight-average molecular weight] is calculated by the method described in the application examples.

Since the sulfonate group-containing copolymers of the present invention have excellent anti-gelling properties, in addition to deposition-inhibiting ability, they have excellent deposition-inhibiting ability, even under harsh conditions such as laundering with residual bath water or laundering with small water volumes, and so they are favorably used in, for example, detergent compositions.

Sulfonate Group-Containing Copolymer Compositions (Polymer Compositions) of the Present Invention The sulfonate group-containing copolymer compositions of the present invention must comprise the sulfonate group-containing copolymers of the present invention. Components other than the sulfonate group-containing copolymer are optional. Normally, [the compositions] also comprise 1 or more selected from polymerization initiator residue, residual monomers, by-products of polymerization and water. Favorable forms for the sulfonate group-containing copolymer composition are forms that comprise 30-80 mass % of the sulfonate group-containing copolymer and 20-70 mass % of water.

Sulfonate Group-Containing Copolymer Manufacturing Method of the Present Invention For the sulfonate group-containing copolymer manufacturing method of the present invention, unless otherwise noted, methods that are the same or modified from well-known polymerization methods can be used. As a method that can manufacture the sulfonate group-containing copolymers of the present invention, [they] can be manufactured by copolymerizing monomer components comprising ether bond-containing monomers (A), carboxyl group-containing monomers (B) and sulfonate group-containing monomers (C) as requisite components. When copolymerizing the monomer components, the above other monomers (D) can also be copolymerized when necessary.

In such a manufacturing method, the monomer components are copolymerized using a polymerization initiator. The varieties and amounts used of the monomers comprised in the monomer components are set as appropriate so that the structural units constituting the sulfonate group-containing copolymer will become as described above. That is, the composition ratio of the various monomers that form the above sulfonate group-containing copolymer is 1 mass % or more and less than 49 mass % of the above ether bond-containing monomers (A), 50 mass % or more and less than 98 mass % of the carboxyl group-containing monomers (B) and 1 mass % or more and less than 49 mass % of the sulfonate group-containing monomers (C). As stated above, the above other monomers (D) that are copolymerizable with these can also be used in amounts of 0-10 mass % when the total of monomers (A) to (C) is 100 mass %. More preferable is 2 mass % or more and less than 40 mass % of ether bond-containing monomers (A), 52 mass % or more and less than 97 mass % of carboxyl group-containing monomers (B) and 2 mass % or more and less than 45 mass % of sulfonate group-containing monomers (C). Even more preferable is 3 mass % or more and less than 30 mass % of ether bond-containing monomers (A), 55 mass % or more and less than 95 mass % of carboxyl group-containing monomers (B), and 3 mass % or more and less than 40 mass % of sulfonate group-containing monomers (C). The total amount of the above monomers (A), (B), (C) and (D) is 100 mass %.

In the present invention, it is preferable that, for the copolymerization of monomers (A)-(C) and, if necessary other monomers (D), water is used for 50 mass % or more of the solvent and/or it is performed in the presence of chain transfer agents. It is more preferable that water is used for 50 mass % or more of the solvent, and it is performed in the presence of chain transfer agents. In this case, by using water for 50 mass % or more of the solvent, the amount of organic solvent used in polymerization can be kept down and, therefore, has the advantage that low molecular weight sulfonate group-containing copolymers can be manufactured efficiently. Particularly if sulfurous acid or sulfite salts are used for the chain transfer agent, it is possible to introduce sulfonate groups quantitatively on the ends of the sulfonate group-containing copolymers obtained, as will be discussed below, and anti-gelling properties can be further improved.

Consequently, a favorable embodiment of the manufacturing method of the present invention pertains to a sulfonate group-containing copolymer manufacturing method that comprises a process that conducts polymerization of 1 mass % or more and less than 50 mass % of ether bond-containing monomers (A) of Formula (1) or (2), 50 mass % or more and less than 98 mass % of carboxyl group-containing monomers (B), 1 mass % or more and less than 50 mass % of sulfonate group-containing monomers (C) and, if necessary other monomers (D) (provided that the total percentage of monomers (A), (B), (C) and (D) is 100 mass %), using water for 50 mass % or more of the solvent used and using a chain transfer agent.

The solvent used in the above embodiment is not particularly limited as long as it contains water in proportions of 50 mass % or more in the total amount of solvent used. From the standpoint of improving solubility of monomers used in the polymerization in the solvent, when necessary, organic solvent can be added. In this case as well, the water content in the total mixed solvent is 50 mass % or more. For organic solvent that can be used in this case, lower alcohols such as methanol, ethanol, or isopropyl alcohol; lower ketones such as acetone, methyl ethyl ketone, or diethyl ketone; ethers such as dimethyl ether or dioxane; amides such as dimethyl formaldehyde can be cited. These solvents can be used alone or can be used in the form of mixtures of 2 or more. In the present invention, it is preferable that the amount of water is 80 mass % or more with respect to the total amount of solvent used. Most preferable is water alone (that is, 100 mass %).

In the manufacturing method of the present invention, performing the copolymerization in the presence of a chain transfer agent is a preferred condition. Chain transfer agents that can be used in this case are not particularly limited, as long as they are compounds that can regulate molecular weight, and well-known chain transfer agents can be used. Concretely, thio chain transfer agents such as mercaptoethanol, thioglycerol, thioglycolic acid, 2-mercaptopropionate, 3-mercaptopropionate, thiomalic acid, octyl thioglycolate, octyl 3-mercaptoproionate, 2-mercaptoethanesulfonic acid, n-dodecylmercaptan, octylmercaptan, or butylthioglycolate; halides such as carbon tetrachloride, methylene chloride, bromoform, or bromotrichloroethane; 2° alcohols such as iseopropanol or glycerol; lower oxides such as phosphorous acid, hypophosphorous acid, and salts thereof (sodium hypophosphite, potassium hypophosphite, etc.) or sulfurous acid, hydrogen sulfite, dithionic acid, metabisulfurous acid, and salts thereof (sodium hydrogen sulfite, potassium hydrogen sulfite, sodium dithionate, potassium dithionate, sodium metabisulfite, potassium metabisulfite, etc.), can be cited. The above chain transfer agents can be used alone or in the form of mixtures of 2 or more. Of these, using sulfurous acid and sulfite salts in the copolymerization reaction of the present invention is ideal. Thereby, it is possible to introduce a sulfonate group quantitatively on the ends of the main chains of the sulfonate group-containing copolymers obtained, and anti-gelling properties can be improved. That a sulfonate group can be introduced quantitatively indicates that sulfite salts function very well as chain transfer agents, thereby making it unnecessary to add excess chain transfer agent, etc., to the polymerization reaction system. Not only is increased copolymer manufacturing cost reduced but manufacturing efficiency is also improved. It is also possible to reduce impurities thoroughly. By adding sulfite salts to the polymerization reaction system, the molecular weight of the copolymer obtained increasing more than necessary is controlled.

In the above manufacturing method, sulfurous acid and/or sulfite salts (written simply as "sulfite (salt)" below) are comprised as chain transfer agents as stated above. In addition to the sulfite (salt), an initiator is used in the above manufacturing method. As a reaction promoter, heavy metal ions can also be used.

The above sulfite (salt) refers to sulfurous acid or hydrogen sulfite or salts thereof. Forms wherein the sulfurous acid/hydrogen sulfite is a salt are suitable. When the sulfurous acid/hydrogen sulfite is a salt, in addition to the above examples, metal atoms, ammonium or organic ammonium salts are suitable. For the above metal atoms, for example, salts of monovalent metal atoms of alkali metals such as lithium, sodium or potassium; divalent metal atoms of alkaline-earth metals such as calcium or magnesium; or trivalent metal atoms such as aluminum or iron are favorable. For organic ammonium (organic amine), alkanolamines such as ethanolamine, diethanolamine and triethanolamine and triethylamine are suitable. It can also be ammonium. Therefore, as sulfites that are favorably used in the present invention, for example, sodium hydrogen sulfite, potassium hydrogen sulfite, ammonium hydrogen sulfite, sodium sulfite, potassium sulfite and ammonium sulfite can be cited. Sodium hydrogen sulfite is particularly suitable. The above sulfite (salt) can be alone or used in the form of mixtures of 2 or more.

In the method of the present invention, the amount added of the chain transfer agent is not particularly limited as long as it is an amount that favorably polymerizes the monomers (A), (B), (C) and, if necessary the other monomers (D). Preferably, it is 1 to 20 g, more preferably 2 to 15 g with respect to 1 mol of total monomer components of monomers (A), (B), (C) and, if necessary monomers (D). If it is less than 1 g, there is a risk that the molecular weight cannot be controlled. Conversely, if it exceeds 20 g, large amounts of impurities are formed, and there is a risk that the purity of the polymer will be reduced. Particularly when using sulfite salts, the excess sulfite salts decompose in the reaction system, and there is a risk of generating sulfurous gas. Moreover, there is also a risk of [excess chain transfer agent] being economically disadvantageous.

For the above initiator, well-known ones can be used. For example, hydrogen peroxide; persulfate salts such as sodium persulfate, potassium persulfate, or ammonium persulfate; azo compounds such as 2,2'-azobis(2-amidinopropane) hydrochloride, 4,4'-azobis-4-cyanovalerate, azobisisobutyronitrile, or 2,2'-azobis(4-methoxy-2,4-dimethylvaleronitrile); organic peroxides such as benzoyl peroxide, lauroyl peroxide, peracetic acid, di-t-butyl peroxide, or cumene hydroperoxide are suitable. Of these polymerization initiators, hydrogen peroxide and persulfates are preferable and persulfates are most preferable. These polymerization initiators can be used alone or in the form of mixtures of 2 or more.

The amount used of the initiator is not particularly restricted as long as it is an amount that can initiate copolymerization of the monomers (A), (B), (C) and, if necessary other monomers (D). But it is preferably less than 10 g, more preferably 1-5 g with respect to 1 mol of total monomer components comprising monomers (A), (B), (C) and, if necessary other monomers (D).

The heavy metal ions to be used as reaction promoters in the present invention refer to metals with specific gravity of 4 g/cm$^3$ or more. For the above metal ions, for example, iron, cobalt, manganese, chromium, molybdenum, tungsten, copper, silver, gold, lead, platinum, iridium, osmium, palladium, rhodium, ruthenium, etc., are favorable. 1, 2 or more of these metals can be used. Of these, iron is more preferable. The ion valence of the above heavy metal ions is not particularly restricted. For example, when iron is used as the heavy metal, the iron ion in the initiator can be $Fe^{2+}$ or $Fe^{3+}$ or a combination of these.

The above heavy metal ion is not particularly restricted as long as it is comprised in ion form. A method using a solution made by solubilizing a heavy metal compound is favorable because of superior manageability. Heavy metal compounds to be used in this case are those that comprise the desired heavy metal ion to be included in the initiator and can be determined according to the initiator used. When using iron as the above heavy metal ion, using heavy metal compounds such as Mohr's salt ($Fe(NH_4)_2(SO_4)_2 \cdot 6H_2O$), ferrous sulfate 7-hydrate, ferrous chloride, or ferric chloride is favorable. When using manganese as the heavy metal ion, manganese chloride can be used suitably. When using these heavy metal compounds, they can be used in the form of aqueous solutions, since they are all water-soluble compounds and the manageability is good. Solvents for the solutions made by solubilizing the above heavy metal compounds are not limited to water and need only be ones that do not interfere with the polymerization reaction and solubilize the heavy metal compound in the manufacture of the sulfonate group-containing copolymers of the present invention.

As for the amount of heavy metal ion when the above heavy metal ion is used, catalytic amounts being included in the polymerization process of the present invention are favorable. A catalytic amount in this specification is an amount that acts as a catalyst without being incorporated in the final target product. Concretely, it is 100 ppm or less, preferably 10 ppm or less and more preferably 5 ppm or less.

As for the amount contained of the above heavy metal ion, it is preferably 0.1-10 ppm with respect to the total mass of the polymerization reaction solution at completion of the polymerization reaction. If the content of heavy metal ion is less than 0.1 ppm, there is a risk that sufficient effect of the heavy metal ion will not be manifested. On the other hand, if the heavy metal ion content exceeds 10 ppm, there is a risk that it will cause a worsening of the color of the polymer obtained. If the heavy metal ion content is high, there is a risk that it will cause fouling of the detergent builder when the product polymer is used as a detergent builder.

The polymerization reaction at completion above refers to the time that the polymerization reaction is essentially complete in the polymerization reaction solution, and the desired polymer is obtained. For example, when the polymer polymerized in the polymerization reaction solution is neutralized with alkaline compounds, the heavy metal ion content is calculated based on the total mass of the polymerization reaction solution after neutralization. When 2 or more kinds of heavy metal ions are included, the total amount of heavy metal ions should be in the range stated above.

For combinations of the above initiator with chain transfer agents, using 1 or more kinds each of a persulfate salt and a sulfite salt is most preferable. In this case, the mixing ratio of the persulfate salt to the sulfite salt is not particularly restricted, but using 0.5-5 parts by mass of sulfite salt with respect to 1 part by mass of persulfate salt is favorable. More preferably, the lower limit of sulfite salt with respect to 1 part by mass of persulfate salt is 1 part by mass and most preferably, it is 2 parts by mass. The upper limit for the sulfite salt is more preferably 4 parts by mass with respect to 1 part by mass of persulfate salt and most preferably, 3 parts by mass. Here, if the sulfite salt is less than 0.5 part by mass, there is a risk that the total amount of initiator when reducing molecular weight will increase. Conversely, when it exceeds 5 parts by mass, there is a risk of side reactions increasing and impurities thereby increasing.

Combinations of the above chain transfer agent, initiator and reaction promoter are not particularly limited and can be selected as appropriate from among the various examples above. For example, for chain transfer agent, initiator and reaction promoter combinations, forms such as sodium hydrogen sulfite (SBS)/hydrogen peroxide ($H_2O_2$), sodium hydrogen sulfite (SBS)/sodium persulfate (NaPS), sodium hydrogen sulfite (SBS)/Fe, sodium hydrogen sulfite (SBS)/hydrogen peroxide ($H_2O_2$)/Fe, sodium hydrogen sulfite (SBS)/sodium persulfate (NaPS)/Fe, sodium hydrogen sulfite (SBS)/sodium persulfate (NaPS)/hydrogen peroxide ($H_2O_2$), and sodium hydrogen sulfite (SBS)/oxygen/Fe are favorable. More preferable are sodium hydrogen sulfite (SBS)/sodium persulfate (NaPS) and sodium hydrogen sulfite (SBS)/sodium persulfate (NaPS)/Fe. Most preferable is sodium hydrogen sulfite (SBS)/sodium persulfate (NaPS)/Fe.

The total amount of the above chain transfer agent, initiator and reaction promoter used is preferably 2-20 g with respect to 1 mol of total monomer components comprising monomers (A), (B), (C) and, if necessary other monomers (D). By using this range, the sulfonate group-containing copolymers of the present invention can be produced efficiently, and the molecular weight distribution of the sulfonate group-containing copolymer can be controlled as desired. More preferable is 4-18 g and even more preferable is 6-15 g.

For the method of adding the above polymerization initiator and chain transfer agent to the reaction vessel, successive addition methods such as dropwise addition or adding in parts can be used. The chain transfer agent can also be introduced into the reaction vessel alone and can also be blended beforehand with the various monomers (A)-(C) or other monomers (D) that make up the monomer components or with the solvent.

For methods for adding the monomer components and polymerization initiator to the reaction vessel in the above copolymerization method, a method of adding all of the monomer components to the reaction vessel and copolymerizing by adding the polymerization initiator to the reaction vessel; a method of adding a portion of the monomer components to the reaction vessel and copolymerizing by adding the polymerization initiator and remaining monomer components to the reaction vessel continuously or in steps (preferably continuously); a method of adding the polymerization solvent to the reaction vessel and adding all of the monomer components and polymerization initiator; a method of adding a portion of one of the monomers (A) to (C) (for example, monomer (B)) to the reaction vessel, and copolymerizing by adding polymerization initiator and the remaining monomer components (the rest of monomer (B) and all of monomers (A), (C) and, if necessary monomers (D)) to the reaction vessel (preferably continuously), etc., are suitable. Among such methods, methods that conduct copolymerization by adding polymerization initiator and monomer components successively dropwise to the reaction vessel are preferable because it is possible to narrow (sharpen) the molecular weight distribution of copolymers obtained and to improve the dispersibility when used as detergent builder.

For the above copolymerization method, for example, methods that are normally used such as solution polymerization, bulk polymerization, suspension polymerization, and emulsion polymerization can be used and are not particularly restricted. However, solution polymerization is preferable. For solvents that can be used for this, mixed solvents wherein 50 mass % of the total solvent is water or water alone is preferable as stated above. Using water alone is ideal in that the solvent removal process can be omitted.

The above copolymerization method can be conducted in batch mode or continuous mode. For solvents that are used when necessary during copolymerization, well-known ones can be used. Water; alcohols such as methyl alcohol, ethyl alcohol, and isopropyl alcohol; glycerol; polyethylene glycol; aromatic or aliphatic hydrocarbons such as benzene, toluene, xylene, cyclohexane or n-heptane; esters such as ethyl acetate; ketones such as acetone or methyl ethyl ketone; amides such as dimethyl formaldehyde; ethers such as diethyl ether or dioxane are suitable. These can be used alone, or 2 or more kinds can be used together. Among these, using water with 1, 2 or more solvents selected from a group comprising 1- to 4-carbon lower alcohols is favorable from the standpoint of solubility of the monomer components and of the copolymers obtained.

For the amount of the above solvent used, 40-200 mass % with respect to 100 mass % of monomer components is favorable. More preferably, it is 45 mass % or more and even more preferably, it is 50 mass % or more. More preferably, it is 180 mass % or less and even more preferably, it than 150 mass % or less. If the amount of solvent used is less than 40 mass %, there is a risk that the molecular weight of the copolymer obtained will increase. If it exceeds 200 mass %, there is a risk that the concentration of the copolymer obtained will decrease, and solvent removal will become necessary. Some or all of the solvent is added to the reaction vessel at the beginning of polymerization. Some of the solvent can be added (dropwise) to the reaction system during the polymerization reaction or it can be added (dropwise) to the reaction system along with the monomer components and initiator during the polymerization reaction by solubilizing these components in the solvent beforehand.

Copolymerization conditions such as copolymerization temperature in the above copolymerization method are determined as appropriate depending on the copolymerization method, solvent and polymerization initiator used. But for the copolymerization temperature, normally, 0° C. and higher is favorable and 150° C. or lower is favorable. More preferably, it is 40° C. or higher, even more preferably, 60° C. or higher and especially preferably, 80° C. or higher. More preferable is 120° C. or lower. Even more preferable is 110° C. or lower. When using sulfite (salt) in particular, the copolymerization temperature is normally 60° C. to 95° C., preferably 70° C. to 95° C. and more preferably 80° C. to 95° C. In this case, at less than 60° C., there is a risk that large amounts of impurities derived from the sulfite (salt) will be produced. Conversely, if it exceeds 95° C., there is a risk that toxic sulfurous acid gas will be released.

It is not necessary for the above copolymerization temperature to be always kept essentially constant in the polymerization reaction. For example, it is possible to start the polymerization at room temperature, raise the temperature for an appropriate temperature increase period or at an appropriate temperature increase rate up to a set temperature and then maintain the set temperature. The temperature can also be made to fluctuate (increase or decrease) over time during the polymerization reaction according to the dropwise addition method for the monomer components and initiator.

30-300 min is favorable for the above copolymerization time. More preferably, it is 60-240 min and even more preferably, it is 120-180 min.

The pressure in the reaction system in the above copolymerization method can be normal pressure (atmospheric pressure), reduced pressure or increased pressure. But in terms of the molecular weight of the copolymers obtained, conducting under normal pressure or sealing the reaction system and conducting under increased pressure is preferable. Conducting under normal pressure (atmospheric pressure) is preferable from the standpoint of equipment such as pressurizing devices or de-pressurizing devices, and pressure resistance of reaction vessels and tubing. The atmosphere in the reaction system can be an air atmosphere. But making it an inert atmosphere is preferable. For example, exchanging the system with an inert gas such as nitrogen prior to polymerization initiation is favorable.

It is preferable that the pH during polymerization in the above copolymerization is acidic. Particularly when using persulfate salts with bisulfite salts together as the above initiator, conducting under acidic conditions is preferable. By conducting under acidic conditions, an increase in viscosity of the aqueous solution of the polymerization reaction system can be kept in check, and the copolymer can be favorably produced. Since the polymerization reaction can be made to proceed under high concentration conditions, it is possible to increase the manufacturing efficiency significantly, [the polymerization] can be made to be a high-concentration polymerization wherein final concentration of solids is 40% or more, and a product with a total content of residual monomer of 30,000 ppm or less can be obtained. It is also possible to improve the polymerizability of the sulfonate group-containing monomers.

For the above acidic conditions, it is preferable that the pH at 25° C. of the reaction solution during polymerization is 1 to 6. More preferably, it is 5 or lower and even more preferably, it is 3 or lower. The copolymers obtained by the above copolymerization method can be used as such as a main component of detergent compositions (detergent builder). But when necessary, they can be neutralized with an alkaline substance and used. For alkaline substances, using inorganic salts such as hydroxides, chlorides or carbonate salts of monovalent metals and divalent metals; ammonia; organic ammonium (organic amines), etc., is favorable.

Neutralization rate when performing copolymerization can be changed as appropriate depending on the initiator. For example, when using persulfate salts and bisulfite salts together, conducting copolymerization of the monomer components with the monomer neutralization rate being 0-60 mass % is favorable when the above monomers can form salts. Monomer neutralization rate is expressed as mol % of monomers that have formed salts when the total mol % number of monomers having carboxyl groups and/or sulfonate groups is 100 mol %. If the monomer neutralization rate exceeds 60 mol %, the polymerization rate in the copolymerization process does not increase, and there is a risk that the molecular weight of the copolymer obtained will decrease or manufacturing efficiency will decrease. More preferably, it is 50 mol % or less and even more preferably, 40 mol % or less. Particularly preferably, it is 30 mol % or less and still more preferably, it is 20 mol % or less. 10 mol % or less is most preferable.

As methods for conducting the copolymerization with the above monomer neutralization rate being 0-60 mol %, for example, when the monomers are unsaturated carboxylic acid monomers, methods that subject the unsaturated carboxylic acid monomers that are all acidic to copolymerization without neutralization or methods, when the unsaturated carboxylic acid monomers are neutralized using an alkaline substance into salt forms such as sodium salts or ammonium salts, of subjecting those with neutralization rates of 0-60 mol % to copolymerization, are suitable.

The above sulfonate group-containing copolymers (or polymer compositions) can be used as water treatment agents, fiber treatment agents, dispersants, detergent builders (or detergent compositions), anti-scaling agents (scale inhibitors), metal ion sealing agents, thickeners, various binders, emulsifiers, skin care agents, hair care agents, etc. As detergent builders, they can be added and used in detergents for various uses such as for clothing, for dishes, for household use, for hair, for the body, for toothpaste or for cars.

Laundry Detergent and Cleaning Compositions Use of the Copolymers

The sulfonate group-containing copolymers (or polymer compositions) of the present invention can be added to detergent compositions.

The content of said sulfonate group-containing copolymers in detergent compositions is not particularly limited. But from the standpoint of manifesting superior performance as builders, the content of sulfonate group-containing copolymers is preferably 0.1-20 mass % with respect to the total amount of detergent composition. More preferable is 0.3-15 mass % and even more preferable is 0.5-10 mass %.

The copolymers of the present invention may be utilized in laundry detergents or cleaning compositions comprising a surfactant system comprising $C_{10}$-$C_{15}$ alkyl benzene sulfonates (LAS) and one or more co-surfactants selected from nonionic, cationic, anionic or mixtures thereof. The selection of co-surfactant may be dependent upon the desired benefit. In one embodiment, the co-surfactant is selected as a nonionic surfactant, preferably $C_{12}$-$C_{18}$ alkyl ethoxylates. In another embodiment, the co-surfactant is selected as an anionic surfactant, preferably $C_{10}$-$C_{18}$ alkyl alkoxy sulfates ($AE_xS$) wherein x is from 1-30. In another embodiment the co-surfactant is selected as a cationic surfactant, preferably dimethyl hydroxyethyl lauryl ammonium chloride. If the surfactant system comprises $C_{10}$-$C_{15}$ alkyl benzene sulfonates (LAS), the LAS is used at levels ranging from about 9% to about 25%, or from about 13% to about 25%, or from about 15% to about 23% by weight of the composition.

The above-mentioned laundry detergent or cleaning composition preferably comprises from about 1% to about 20% by weight of the hydrophobic group-containing copolymer composition.

The surfactant system may comprise from 0% to about 7%, or from about 0.1% to about 5%, or from about 1% to about 4% by weight of the composition of a co-surfactant selected from a nonionic co-surfactant, cationic co-surfactant, anionic co-surfactant and any mixture thereof.

Non-limiting examples of nonionic co-surfactants include: $C_{12}$-$C_{18}$ alkyl ethoxylates, such as, NEODOL® nonionic surfactants from Shell; $C_6$-$C_{12}$ alkyl phenol alkoxylates wherein the alkoxylate units are a mixture of ethyleneoxy and propyleneoxy units; $C_{12}$-$C_{18}$ alcohol and $C_6$-$C_{12}$ alkyl phenol condensates with ethylene oxide/propylene oxide block alkyl polyamine ethoxylates such as PLURONIC® from BASF; $C_{14}$-$C_{22}$ mid-chain branched alcohols, BA, as discussed in U.S. Pat. No. 6,150,322; $C_{14}$-$C_{22}$ mid-chain branched alkyl alkoxylates, $BAE_x$, wherein x is from 1-30, as discussed in U.S. Pat. No. 6,153,577, U.S. Pat. No. 6,020,303 and U.S. Pat. No. 6,093,856; alkylpolysaccharides as discussed in U.S. Pat. No. 4,565,647 Llenado, issued Jan. 26, 1986; specifically alkylpolyglycosides as discussed in U.S. Pat. No. 4,483,780 and U.S. Pat. No. 4,483,779; polyhydroxy fatty acid amides as discussed in U.S. Pat. No. 5,332,528; and ether capped poly(oxyalkylated) alcohol surfactants as discussed in U.S. Pat. No. 6,482,994 and WO 01/42408.

Non-limiting examples of semi-polar nonionic co-surfactants include: water-soluble amine oxides containing one alkyl moiety of from about 10 to about 18 carbon atoms and 2 moieties selected from the group consisting of alkyl moieties and hydroxyalkyl moieties containing from about 1 to about 3 carbon atoms; water-soluble phosphine oxides containing one alkyl moiety of from about 10 to about 18 carbon atoms and 2 moieties selected from the group consisting of alkyl moieties and hydroxyalkyl moieties containing from about 1 to about 3 carbon atoms; and water-soluble sulfoxides containing one alkyl moiety of from about 10 to about 18 carbon atoms and a moiety selected from the group consisting of alkyl moieties and hydroxyalkyl moieties of from about 1 to about 3 carbon atoms. See WO 01/32816, U.S. Pat. No. 4,681,704, and U.S. Pat. No. 4,133,779.

Non-limiting examples of cationic co-surfactants include: the quaternary ammonium surfactants, which can have up to 26 carbon atoms include: alkoxylate quaternary ammonium (AQA) surfactants as discussed in U.S. Pat. No. 6,136,769; dimethyl hydroxyethyl quaternary ammonium as discussed in U.S. Pat. No. 6,004,922; dimethyl hydroxyethyl lauryl ammonium chloride; polyamine cationic surfactants as discussed in WO 98/35002, WO 98/35003, WO 98/35004, WO 98/35005, and WO 98/35006; cationic ester surfactants as discussed in U.S. Pat. Nos. 4,228,042, 4,239,660 4,260,529 and U.S. Pat. No. 6,022,844; and amino surfactants as discussed in U.S. Pat. No. 6,221,825 and WO 00/47708, specifically amido propyldimethyl amine (APA).

Nonlimiting examples of anionic co-surfactants useful herein include: $C_{10}$-$C_{20}$ primary, branched chain and random alkyl sulfates (AS); $C_{10}$-$C_{18}$ secondary (2,3) alkyl sulfates; $C_{10}$-$C_{18}$ alkyl alkoxy sulfates ($AE_xS$) wherein x is from 1-30; $C_{10}$-$C_{18}$ alkyl alkoxy carboxylates comprising 1-5 ethoxy units; mid-chain branched alkyl sulfates as discussed in U.S. Pat. No. 6,020,303 and U.S. Pat. No. 6,060,443; mid-chain branched alkyl alkoxy sulfates as discussed in U.S. Pat. No. 6,008,181 and U.S. Pat. No. 6,020,303; modified alkylbenzene sulfonate (MLAS) as discussed in WO 99/05243, WO 99/05242 and WO 99/05244; methyl ester sulfonate (MES); and alpha-olefin sulfonate (AOS).

The present invention may also relates to compositions comprising the inventive copolymers and a surfactant system comprising $C_8$-$C_{18}$ linear alkyl sulphonate surfactant and a co-surfactant. The compositions can be in any form, namely, in the form of a liquid; a solid such as a powder, granules, agglomerate, paste, tablet, pouches, bar, gel; an emulsion; types delivered in dual-compartment containers; a spray or foam detergent; premoistened wipes (i.e., the cleaning composition in combination with a nonwoven material such as that discussed in U.S. Pat. No. 6,121,165, Mackey, et al.); dry wipes (i.e., the cleaning composition in combination with a nonwoven materials, such as that discussed in U.S. Pat. No. 5,980,931, Fowler, et al.) activated with water by a consumer; and other homogeneous or multiphase consumer cleaning product forms.

In one embodiment, the cleaning composition of the present invention is a liquid or solid laundry detergent composition. In another embodiment, the cleaning composition of the present invention is a hard surface cleaning composition, preferably wherein the hard surface cleaning composition impregnates a nonwoven substrate. As used herein "impregnate" means that the hard surface cleaning composition is placed in contact with a nonwoven substrate such that at least a portion of the nonwoven substrate is penetrated by the hard surface cleaning composition, preferably the hard surface cleaning composition saturates the nonwoven substrate. The cleaning composition may also be utilized in car care compositions, for cleaning various surfaces such as hard wood, tile, ceramic, plastic, leather, metal, glass. This cleaning composition could be also designed to be used in a personal care and pet care compositions such as shampoo composition, body wash, liquid or solid soap and other cleaning composition in which surfactant comes into contact with free hardness and in all compositions that require hardness tolerant surfactant system, such as oil drilling compositions.

In another embodiment the cleaning composition is a dish cleaning composition, such as liquid hand dishwashing compositions, solid automatic dishwashing compositions, liquid automatic dishwashing compositions, and tab/unit does forms of automatic dishwashing compositions.

Automatic detergent compositions may comprise low foaming nonionic surfactants (LFNIs). LFNI can be present in amounts from about 0.25% to about 4%. LFNIs are most typically used in automatic detergents on account of the improved water-sheeting action (especially from glass) which they confer to the gel automatic detergents. Preferred LFNIs include nonionic alkoxylated surfactants, especially ethoxylates derived from primary alcohols, and blends thereof with more sophisticated surfactants, such as the polyoxypropylene/polyoxyethylene/polyoxypropylene reverse block polymers. The PO/EO/PO polymer-type surfactants are well-known to have foam suppressing or defoaming action, especially in relation to common food soil ingredients such as egg. In a preferred embodiment, the LFNI is an ethoxylated surfactant derived from the reaction of a monohydroxy alcohol or alkylphenol containing from about 8 to about 20 carbon atoms, excluding cyclic carbon atoms, with from about 6 to about 15 moles of ethylene oxide per mole of alcohol or alkyl phenol on an average basis. A particularly preferred LFNI is derived from a straight chain fatty alcohol containing from about 16 to about 20 carbon atoms ($C_{16}$-$C_{20}$alcohol), preferably a $C_{18}$alcohol, condensed with an average of from about 6 to about 15 moles, preferably from about 7 to about 12 moles, and most preferably from about 7 to about 9 moles of ethylene oxide per mole of alcohol. Preferably the ethoxylated nonionic surfactant so derived has a narrow ethoxylate distribution relative to the average.

The LFNI can optionally contain propylene oxide in an amount up to about 15% by weight. Certain of the block polymer surfactant compounds designated PLURONIC® and TETRONIC® by the BASF-Wyandotte Corp., Wyandotte, Mich., are suitable in gel automatic detergents of the invention. LFNIs which may also be used include a C-18 alcohol polyethoxylate, having a degree of ethoxylation of about 8, commercially available as "SLF-18 Poly-tergent" from BASF Corp.

Dish washing compositions may additionally contain a dispersant polymer typically in the range from 0 to about 25%, preferably from about 0.5% to about 20%, more preferably from about 1% to about 7% by weight of the detergent. The dispersant polymer may be ethoxylated cationic diamines or ethoxylated cationic polyamines described in U.S. Pat. No. 4,659,802. Other dispersant polymers suitable for use include co-polymers synthesized from acrylic acid, maleic acid and methacrylic acid such as ACUSOL® 480N supplied by Rohm & Haas and an acrylic-maleic (ratio 80/20) phosphono end group dispersant copolymers sold under the tradename of Acusol 425N (E) available from Rohm &Haas. Polymers containing both carboxylate and sulphonate monomers, such as ALCOSPERSE® polymers (supplied by Alco) are also acceptable dispersant polymers. In one embodiment an ALCOSPERSE® polymer sold under the trade name ALCOSPERSE® 725, is a co-polymer of Styrene and Acrylic Acid with the following structure:

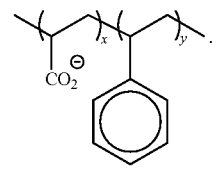

x:y = 60:40, or 50:50, MW = 8000

ALCOSPERSE® 725 may also provide a metal corrosion inhibition benefit.

Other dispersant polymers are low molecular weight modified polyacrylate copolymers including the low molecular weight copolymers of unsaturated aliphatic carboxylic acids disclosed in U.S. Pat. Nos. 4,530,766, and 5,084,535 and European Patent Application No. 66,915, published Dec. 15, 1982.

Dish washing compositions may utilize detergent builders to assist in controlling mineral hardness and dispersancy. Inorganic as well as organic builders can be used. Embodiment of such dish washing product can be selected from the group consisting of phosphate, phosphate oligomers or polymers and salts thereof, silicate oligomers or polymers and salts thereof, aluminosilicates, magnesioaluminosiliates, citrate, methyl glycine diacetic acid and/or salts thereof, glutamatic diacetic acid and/or salts thereof and mixtures thereof. Phosphate detergent builders include, but are not limited to, the alkali metal, ammonium and alkanolammonium salts of polyphosphates. Silicate builders herein are any silicates which are soluble to the extent that they do not adversely affect spotting/filming characteristics of the gel detergent composition. Aluminosilicate builders can be used in the present compositions though are not preferred for automatic dishwashing detergents. Carbonate builders include alkaline earth and alkali metal carbonates as disclosed in German Patent Application No. 2,321,001 published on Nov. 15, 1973. Various grades and types of sodium carbonate and sodium sesquicarbonate can be used, certain of which are particularly useful as carriers for other ingredients, especially: detersive surfactants. Organic detergent builders include a wide variety of polycarboxylate compounds. Other useful builders include the ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, the various I alkali metal, ammonium and substituted ammonium salts of polyacetic acids such as ethylenediaminetetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof. Citrate builders, e.g., citric acid and soluble salts thereof (particularly sodium salt), are polycarboxylate builders of particular importance for heavy duty laundry detergent and automatic dishwashing formulations due to their availability from renewable resources and their biodegradability. Methyl glycine diacetic acid and/or salts thereof (MGDA) may also be utilized as builders in the present composition. A preferred MGDA compound is a salt of methyl glycine iacetic acid Suitable salts include the diammonium 1.0 slt, the dipotassium salt and, preferably, the disodium salt. Glutamatic diacetic acid and/or salts thereof (GLDA) may also be utilized as builders in the present compositions. A preferred GLDA compound is a salt of glutamic diacetic acid. Suitable salts include the diammonium salt, the dipotassium salt and, preferably, the disodium salt. 1-hydroxyethylidene-1,1-diphosphonic acid (HEDP) may also be utilized as a builder in the present compositions.

Perfume may be added to the compositions of the present invention. The detergent compositions can contain agents that are effective as corrosion inhibitors and/or anti-tarnish aids.

"Detergent enzyme", as used herein, means any enzyme having a cleaning, stain removing or otherwise beneficial effect in a gel detergent composition. Preferred enzymes are hydrolases such as proteases, amylases and lipases. Highly preferred for automatic dishwashing are amylases and/or proteases, including both current commercially available types and improved types. Enzyme-containing compositions herein can comprise from about 0.001% to about 10%, preferably from about 0.005% to about 8%, most preferably from about 0.01% to about 6%, by weight of an enzyme.

The compositions herein can also optionally contain one or more transition-metal selective sequestrants, "chelants" or "chelating agents", e.g., iron and/or copper and/or manganese chelating agents. Chelating agents suitable for use herein can be selected from the group consisting of aminocarboxylates, phosphonates (especially the aminophosphonates), polyfunctionally-substituted aromatic chelating agents, and mixtures thereof. Commercial chelating agents for use herein include the BEQUEST series, and chelants from Monsanto, DuPont, and Nalco, Inc.

The detergent composition can be preferably low foaming, readily soluble in the washing medium and most effective at pH values best conducive to improved cleaning performance, such as in a range of desirably from about pH 6.5 to about pH 12.5, and preferably from about pH 7.0 to about pH 12.0, more preferably from about pH 8.0 to about pH 12.0. The pH adjusting components are desirably selected from sodium or potassium hydroxide, sodium or potassium carbonate or sesquicarbonate, sodium or potassium silicate, boric acid, sodium or potassium bicarbonate, sodium or potassium borate, and mixtures thereof.

An embodiment of the present invention relates to a gel detergent composition comprising an organic solvent selected from the group consisting of low molecular weight aliphatic or aromatic alcohols, low molecular weight alkylene glycols, low molecular weight alkylene glycol ethers, low molecular weight esters, low molecular weight alkylene amines, low molecular weight alkanolamines, and mixtures thereof.

Any adjunct ingredient in any amount may be used in the gel detergent composition. For example, adjunct ingredients may be selected from the group consisting of nanoparticles, functionalized surface molecules, polymers, surfactants, co-surfactants, metal ions, proteins, dyes, acids, optical brighteners, colorants, filler salts, hydrotropes, preservatives, antioxidants, germicides, fungicides, color speckles, solubilizing agents, carriers and mixtures thereof.

Quite typically, cleaning compositions herein such as laundry detergents, laundry detergent additives, hard surface cleaners, synthetic and soap-based laundry bars, fabric softeners and fabric treatment liquids, solids and treatment articles of all kinds will require several adjuncts, though certain simply formulated products, such as bleach additives, may require only, for example, an oxygen bleaching agent and a surfactant as described herein. A comprehensive list of suitable laundry or cleaning adjunct materials can be found in WO 99/05242.

Common cleaning adjuncts include builders, enzymes, polymers not discussed above, bleaches, bleach activators, catalytic materials and the like excluding any materials already defined hereinabove. Other cleaning adjuncts herein can include suds boosters, suds suppressors (antifoams) and the like, diverse active ingredients or specialized materials such as dispersant polymers (e.g., from BASF Corp. or Rohm & Haas) other than those described above, color speckles, silvercare, anti-tarnish and/or anti-corrosion agents, dyes, fillers, germicides, alkalinity sources, hydrotropes, anti-oxidants, enzyme stabilizing agents, pro-perfumes, perfumes, solubilizing agents, carriers, processing aids, pigments, and, for liquid formulations, solvents, chelating agents, dye transfer inhibiting agents, dispersants, brighteners, suds suppressors, dyes, structure elasticizing agents, fabric softeners, anti-abrasion agents, hydrotropes, processing aids, and other fabric care agents, surface and skin care agents. Suitable examples of such other cleaning adjuncts and levels of use are found in U.S. Pat. Nos. 5,576,282, 6,306,812 B1 and 6,326,348 B1.

The above-mentioned laundry detergent or cleaning composition preferably contains cleaning adjunct additives selected from the group consisting of enzymes, alkali builders, chelant builders, bleaches, bleaching assisting agents, perfumes, defoaming agents, bactericides, corrosion inhibitors, and mixtures thereof.

Method of Use

The present invention includes a method for cleaning a targeted surface. As used herein "targeted surface" may include such surfaces such as fabric, dishes, glasses, and other cooking surfaces, hard surfaces, hair or skin. As used herein "hard surface" includes hard surfaces being found in a typical home such as hard wood, tile, ceramic, plastic, leather, metal, glass. Such method includes the steps of contacting the composition comprising the modified polyol compound, in neat form or diluted in wash liquor, with at least a portion of a targeted surface then optionally rinsing the targeted surface. Preferably the targeted surface is subjected to a washing step prior to the aforementioned optional rinsing step. For purposes of the present invention, washing includes, but is not limited to, scrubbing, wiping and mechanical agitation.

As will be appreciated by one skilled in the art, the cleaning compositions of the present invention are ideally suited for use in home care (hard surface cleaning compositions) and/or laundry applications.

The composition solution pH is chosen to be the most complimentary to a target surface to be cleaned spanning broad range of pH, from about 5 to about 11. For personal care such as skin and hair cleaning pH of such composition preferably has a pH from about 5 to about 8 for laundry cleaning compositions pH of from about 8 to about 10. The compositions are preferably employed at concentrations of from about 200 ppm to about 10,000 ppm in solution. The water temperatures preferably range from about 5° C. to about 100° C.

For use in laundry cleaning compositions, the compositions are preferably employed at concentrations from about 200 ppm to about 10000 ppm in solution (or wash liquor). The water temperatures preferably range from about 5° C. to about 60° C. The water to fabric ratio is preferably from about 1:1 to about 20:1.

The method may include the step of contacting a nonwoven substrate impregnated with an embodiment of the composition of the present invention As used herein "nonwoven substrate" can comprise any conventionally fashioned nonwoven sheet or web having suitable basis weight, caliper (thickness), absorbency and strength characteristics. Examples of suitable commercially available nonwoven substrates include those marketed under the tradename SONTARA® by DuPont and POLYWEB® by James River Corp.

As will be appreciated by one skilled in the art, the cleaning compositions of the present invention are ideally suited for use in liquid dish cleaning compositions. The method for using a liquid dish composition of the present invention comprises the steps of contacting soiled dishes with an effective amount, typically from about 0.5 ml. to about 20 ml. (per 25 dishes being treated) of the liquid dish cleaning composition of the present invention diluted in water.

In addition to the sulfonate group-containing copolymers (or polymer compositions) of the present invention, the above detergent compositions can comprise other detergent builders. Other detergent builders are not particularly limited. But for example, alkaline builders such as carbonate salts, bicarbonate salts and silicate salts, tripolyphosphate salts, pyrophosphate salts, Glauber's salt, nitrilotriacetate salts, ethylenediamine tetraacetate salts, citrate salts, (meth)acrylate copolymer salts, acrylic acid-maleic acid copolymers, fumarate salts, chelate builders such as zeolite, carboxyl derivatives of polysaccharides such as carboxymethylcellulose can be cited. As counterions to be used in the above builders, alkali metals such as sodium or potassium and ammonium and amines can be cited.

As for proportion blended of the total of the above additives and other detergent builders, normally 0.1-50 mass % with respect to 100 mass % of the detergent composition is favorable. 0.2-40 mass % is more preferable. 0.3-35 mass % is even more preferable. 0.4-30 mass % is particularly preferable, and most preferable is 0.5 to 20 mass %. If the amount of additive/ other detergent builder blended is less than 0.1 mass %, there is a risk that sufficient detergent performance cannot be manifested. If it exceeds 50 mass %, there is a risk of decreased economy.

In addition to synthetic household detergents, industrial detergents for the textile industry and others, and hard surface cleansers, the above concept of detergent compositions includes detergents that are used only in specific uses wherein the effects of 1 of the components thereof have been augmented, such as bleaching detergents.

When the above detergent composition is a liquid detergent composition, it is preferable that the kaolin turbidity is 200 mg/L or less. 150 mg/L or less is more preferable. Even more preferable is 120 mg/L or less. 100 mg/L or less is particularly preferable and 50 mg/L or less is most preferable.

Kaolin Turbidity Measurement Method

Evenly stirred sample (liquid detergent) was placed in a 50 mm square cell of 10 mm thickness. After removing air bubbles, the turbidity (kaolin turbidity: mg/L) was measured at 25° C. using NDH2000 (product name, turbidity meter) made by Nippon Denshoku Co., Ltd.

For enzymes that can be blended in the above detergent compositions, proteases, lipases, and cellulases are suitable. Of these, proteases, alkaline lipases and alkaline cellulases that have high activity in alkaline detergent solutions are preferable.

The addition amount of the above enzymes is favorably 5 mass % or less with respect to 100 mass % of the detergent composition. If it exceeds 5 mass %, improvement of detergent power is no longer seen, and there is a risk of decreased economy.

For the above alkaline builders, silicate salts, carbonate salts and sulfate salts are suitable. For the above chelate builders, diglycolic acid, oxycarboxylate salts, EDTA (ethylenediamine tetraacetate), DTPA (diethylenetriamine pentaacetate), STPP (sodium tripolyphosphate), and citric acid are suitable. Other water-soluble polycarboxylate polymers besides the copolymers in the present invention can be used.

The above detergent compositions have superior dispersibility, have very high-quality performance such that reduced performance when stored for long periods and deposition of impurities when stored at low temperatures do not occur easily, and can be used as detergents with superior stability.

The present invention further contains a cleaning implement comprising a nonwoven substrate and the above-mentioned laundry detergent or cleaning composition.

EXAMPLES

The present invention will be explained further below citing application examples. But the present invention is not limited only to these application examples. Unless otherwise noted, "parts" mean "parts by mass" and "%" means "mass %."

The weight-average molecular weights, deposition-inhibiting ability, etc., of the sulfonate group-containing copolymers of the present invention were measured by the following methods.

Weight-average molecular weight measurement conditions

Device: L-7000 series made by Hitachi Co.
Detector: RI
Column: SHODEX Asahipak GF-310-HQ, GF-710-HQ, GF-1G 7B made by Showa Denko Co.
Column temperature: 40° C.
Flow rate: 0.5 mL/min Calibration curve: Polyacrylic acid standard made by Sowa Kagaku Co., Ltd.

Elution solution: 0.1N sodium acetate/acetonitrile=3/1 (mass ratio)

Deposition-Inhibiting Ability (LAS-Ca Salt Deposition-Inhibiting Ability) Measurement Method (1) Pure water was added to 9.3793 g glycine, 9.6452 g sodium chloride, and 5.1975 g sodium hydroxide and made up to 1000.0 g, and a glycine buffer was prepared.

(2) Pure water was added to 1.50 g of a 15% (w/w) aqueous sodium dodecylbenzene sulfonate (LAS) solution, 0.80 g of sodium sulfate and 11.25 g of the glycine buffer prepared in (1) and made up to 500.0 g.

(3) 0.1% (w/w) aqueous sample polymer solution was prepared.

(4) 1M aqueous calcium chloride 2-hydrate solution was prepared.

(5) To a 100-mL beaker, 1.80 g of 0.1% aqueous sample polymer solution prepared in (3), 8.20 g pure water and 80.00 g of (2) were added to make a test solution.

(6) To the test solution, the 1M aqueous calcium chloride 2-hydrate solution prepared in (4) was added dropwise and stirred, and the change in turbidity was measured. For measurement, an automated dropwise addition device made by Hiranuma Sangyo (main body: COM-550, light intensity speed unit; M-500) was used. The change in turbidity was measured with the change in transmittance at a wavelength of 650 nm.

(7) Transmittance when the amount of 1M aqueous calcium chloride 2-hydrate solution added was 0.270 mL was called the deposition-inhibiting ability. Higher values meant better deposition-inhibiting ability.

Measurement Method for Solids in the Polymer Composition

Under a nitrogen atmosphere, the polymer composition (1.0 g of polymer composition+3.0 g of water) was placed in an oven heated to 130° C. and dried for 1 h. From the changes in weight before and after drying, the solids (%) and volatile components (%) were calculated.

Ether Bond-Containing Monomer Synthesis Example 1

To a glass separable flask of 500-mL volume equipped with a stirrer (paddle fins), 81.2 g of New cole 2305 (made by Nippon Nyukazai Co., Ltd.; 5 mol ethylene oxide adduct of C12-13 alcohol) and 16.8 g of potassium hydroxide (also called "KOH" below) were added. Nitrogen gas was blown in and, while stirring, the temperature was raised to 120° C. By maintaining this state for 1 h, the reaction system was dehydrated. Next, a reflux condenser was attached. The temperature was reduced to 60° C. 27.0 g of methallyl chloride (also called "MLC" below) were added over 30 min and then reacted for 5 h. 200.0 g of pure water were added to this and after reacting for 1 h, [the mixture] was neutralized with sulfuric acid. After cooling to room temperature, this aqueous solution was transferred to a 500-mL separatory funnel, left standing until the layers separated, and the lower layer was removed. The remaining upper layer was transferred to a 300-mL Florence flask, and solvent was removed with a rotary evaporator. By removing deposited salts by filtration, Monomer 1 was obtained.

Application Example 1

To a glass separable flask of 1000-mL volume equipped with a reflux condenser and stirrer (paddle fins), 55.0 g of pure water and 0.0122 g of Mohr's salt were added and, while stirring, the temperature was raised to 90° C., and [this] was used as the polymerization reaction system. Next, while stirring, 200.0 g of 80% aqueous acrylic acid solution (also called "80% AA" below), 9.3 g of 48% aqueous sodium hydroxide solution (also called "48% NaOH" below), 75.0 g of 40% aqueous sodium 3-allyloxy-2-hydroxypropane sulfonate solution (also called "40% HAPS" below), 10.0 g of Monomer 1, 47.6 g of 15% aqueous sodium persulfate solution (also called "15% NaPS" below) and 34.0 g of 35% aqueous sodium hydrogen sulfite solution (also called "35% SBS" below) were added dropwise from separate nozzles to the polymerization reaction system maintained at 90° C. Dropwise addition times for the respective solutions were 180 min for 80% AA and 48% NaOH, 120 min for 40% HAPS and Monomer 1, 190 min for 15% NaPS and 175 min for 35% SBS. The dropwise addition rate for the various solutions was constant, and dropwise addition of the various solutions was performed continuously.

After completion of the 80% AA dropwise addition, the above reaction solution was maintained (cured) at 90° C. for another 30 min, and polymerization was completed. After completion of polymerization, while stirring and allowing the polymerization reaction solution to cool, 148.1 g of 48% NaOH were added dropwise slowly, and the polymerization reaction solution was neutralized.

In this manner, an aqueous solution (Polymer Composition 1) of 12,000 weight-average molecular weight Polymer 1 (sulfonate group-containing Copolymer 1) of 44.9% solids concentration was obtained.

Application Example 2

To a glass separable flask of 1000-mL volume equipped with reflux condenser and stirrer (paddle fins), 69.0 g of pure water, 30.0 g of Monomer 1 and 0.0121 g of Mohr's salt were added and, while stirring, the temperature was raised to 90° C., and [this] was used as the polymerization reaction system. Next, while stirring, 175.0 g of 80% AA, 8.1 g of 48% NaOH, 75.0 g of 40% HAPS, 42.9 g of 15% NaPS and 42.9 g of 35% SBS were added dropwise from separate nozzles to the polymerization reaction system maintained at 90° C. Dropwise addition times for the respective solutions were 180 min for 80% AA and 48% NaOH, 120 min for 40% HAPS, 190 min for 15% NaPS and 175 min for 35% SBS. The dropwise addition rate for the various solutions was constant, and dropwise addition of the various solutions was performed continuously.

After completion of the 80% AA dropwise addition, the above reaction solution was maintained (cured) at 90° C. for another 30 min, and polymerization was completed. After completion of polymerization, while stirring and allowing the polymerization reaction solution to cool, 129.6 g of 48% NaOH were added dropwise slowly, and the polymerization reaction solution was neutralized.

In this manner, an aqueous solution (Polymer Composition 2) of 19,000 weight-average molecular weight Polymer 2 (sulfonate group-containing Copolymer 2) of 45.0% solids concentration was obtained.

Ether Bond-containing Monomer Synthesis Example 2

To a glass separable flask of 500-mL volume equipped with reflux condenser and a stirrer (paddle fins), 370.0 g of n-butyl alcohol and 4.27 g of KOH were added. While stirring, the temperature was raised to 90° C. Next, 57.0 g of allyl glycidyl ether (also called "AGE" below) were added over 30 min and then reacted for 5 h. After cooling to room temperature and neutralizing with sulfuric acid, this aqueous solution was transferred to a 1000-mL Florence flask and solvent was removed with a rotary evaporator. 200.0 g of pure water were added to this, and this aqueous solution was transferred to a 500-mL reparatory funnel, left standing until the layers separated, and the lower layer was removed. The remaining upper layer was transferred to a 300-mL Florence flask, and solvent was removed with a rotary evaporator. By removing deposited salts by filtration, Monomer 2 was obtained.

Application Example 3

To a glass separable flask of 1000-mL volume equipped with reflux condenser and stirrer (paddle fins), 57.0 g of pure water and 0.0178 g of Mohr's salt were added and, while stirring, the temperature was raised to 90° C., and [this] was used as the polymerization reaction system. Next, while stirring, 225.0 g of 80% AA, 10.4 g of 48% NaOH, 225.0 g of 40% HAPS, 30.0 g of Monomer 2, 61.4 g of 15% NaPS and 70.2 g of 35% SBS were added dropwise from separate nozzles to the polymerization reaction system maintained at 90° C. Dropwise addition times for the respective solutions were 180 min for 80% AA and 48% NaOH, 120 min for 40% HAPS and Monomer 2, 190 min for 15% NaPS and 175 min for 35% SBS. The dropwise addition rate for the various solutions was constant, and dropwise addition of the various solutions was performed continuously.

After completion of the 80% AA dropwise addition, the above reaction solution was maintained (cured) at 90° C. for another 30 min, and polymerization was completed. After completion of polymerization, while stirring and allowing the polymerization reaction solution to cool, 166.7 g of 48% NaOH were added dropwise slowly and the polymerization reaction solution was neutralized.

In this manner, an aqueous solution (Polymer Composition 3) of 15,000 weight-average molecular weight Polymer 3 (sulfonate group-containing Copolymer 3) of 44.8% solids concentration was obtained.

Ether Bond-Containing Monomer Synthesis
Example 3

To a glass separable flask of 500-mL volume equipped with a reflux condenser and stirrer (paddle fins), 34.8 g of a 1-mol ethylene oxide adduct of methallyl alcohol (also called "MLA1" below) and 1.8 g of KOH were added. While stirring, the temperature was raised to 90° C. Next, 55.8 g of 2-ethylhexyl glycidyl ether (also called "EHGE" below) were added over 30 min and then reacted for 5 h. 200.0 g of pure water were added to this and, after reacting for 1 h, [the mixture] was neutralized with sulfuric acid. After cooling to room temperature, this aqueous solution was transferred to a 500-mL separatory funnel, left standing until the layers separated, and the lower layer was removed. The remaining upper layer was transferred to a 300-mL Florence flask, and solvent was removed with a rotary evaporator. By removing deposited salts by filtration, Monomer 3 was obtained.

Application Example 4

To a glass separable flask of 1000-mL volume equipped with reflux condenser and stirrer (paddle fins), 39.0 g of pure water and 0.0119 g of Mohr's salt were added and, while stirring, the temperature was raised to 90° C., and [this] was used as the polymerization reaction system. Next, while stirring, 150.0 g of 80% AA, 6.9 g of 48% NaOH, 150.0 g of 40% HAPS, 20.0 g of Monomer 3, 40.2 g of 15% NaPS and 45.9 g of 35% SBS were added dropwise from separate nozzles to the polymerization reaction system maintained at 90° C. Dropwise addition times for the respective solutions were 180 min for 80% AA and 48% NaOH, 120 min for 40% HAPS and Monomer 3, 190 min for 15% NaPS and 175 min for 35% SBS. The dropwise addition rate for the various solutions was constant, and dropwise addition of the various solutions was performed continuously.

After completion of the 80% AA dropwise addition, the above reaction solution was maintained (cured) at 90° C. for another 30 min, and polymerization was completed. After completion of polymerization, while stirring and allowing the polymerization reaction solution to cool, 111.1 g of 48% NaOH were added dropwise slowly, and the polymerization reaction solution was neutralized.

In this manner, an aqueous solution (Polymer Composition 4) of 16,000 weight-average molecular weight Polymer 4 (sulfonate group-containing Copolymer 4) of 44.7% solids concentration was obtained.

Ether Bond-Containing Monomer Synthesis
Example 4

To a glass separable flask of 500-mL volume equipped with a reflux condenser and stirrer (paddle fins), 46.4 g of MLA1 and 2.0 g of KOH were added. While stirring, the temperature was raised to 90° C. Next, 52.0 g of n-butyl glycidyl ether (also called "BGE" below) were added over 30 min and then reacted for 5 h. 200.0 g of pure water were added to this and, after reacting for 1 h, [the mixture] was neutralized with sulfuric acid. After cooling to room temperature, this aqueous solution was transferred to a 500-mL separatory funnel, left standing until the layers separated, and the lower layer was removed. The remaining upper layer was transferred to a 300-mL Florence flask and solvent was removed with a rotary evaporator. By removing deposited salts by filtration, Monomer 4 was obtained.

Application Example 5

To a glass separable flask of 1000-mL volume equipped with reflux condenser and stirrer (paddle fins), 84.0 g of pure water, 40.0 g of Monomer 4 and 0.0121 g of Mohr's salt were added and, while stirring, the temperature was raised to 90° C., and [this] was used as the polymerization reaction system. Next, while stirring, 175.0 g of 80% AA, 8.1 g of 48% NaOH, 50.0 g of 40% HAPS, 44.0 g of 15% NaPS and 44.0 g of 35% SBS were added dropwise from separate nozzles to the polymerization reaction system maintained at 90° C. Dropwise addition times for the respective solutions were 180 min for 80% AA and 48% NaOH, 120 min for 40% HAPS, 185 min for 15% NaPS and 175 min for 35% SBS. The dropwise addition rate for the various solutions was constant, and dropwise addition of the various solutions was performed continuously.

After completion of the 80% AA dropwise addition, the above reaction solution was maintained (cured) at 90° C. for another 30 min, and polymerization was completed. After completion of polymerization, while stirring and allowing the polymerization reaction solution to cool, 129.6 g of 48% NaOH were added dropwise slowly, and the polymerization reaction solution was neutralized.

In this manner, an aqueous solution (Polymer Composition 5) of 16,000 weight-average molecular weight Polymer 5 (sulfonate group-containing Copolymer 5) of 44.8% solids concentration was obtained.

Ether Bond-Containing Monomer Synthesis
Example 5

To a glass separable flask of 500-mL volume equipped with a stirrer (paddle fins), 63.6 g of New cole 2303 (made by Nippon Nyukazai Co., Ltd.; 3 mol ethylene oxide adduct of C 12-13 alcohol) and 16.8 g of KOH were added. Nitrogen gas was blown in and, while stirring, the temperature was raised to 120° C. By maintaining this state for 1 h, the reaction system was dehydrated. Next, a reflux condenser was attached. The temperature was reduced to 60° C. 27.0 g of MLC were added over 30 min and then reacted for 5 h. 200.0 g of pure water were added to this and, after reacting for 1 h, [the mixture] was neutralized with sulfuric acid. After cooling to room temperature, this aqueous solution was transferred to a 500-mL separatory funnel, left standing until the layers separated, and the lower layer was removed. The remaining upper layer was transferred to a 300-mL Florence flask and solvent was removed with a rotary evaporator. By removing deposited salts by filtration, Monomer 5 was obtained.

Application Example 6

To a glass separable flask of 1000-mL volume equipped with reflux condenser and stirrer (paddle fins), 30.0 g of pure water and 0.0120 g of Mohr's salt were added and, while stirring, the temperature was raised to 90° C., and [this] was used as the polymerization reaction system. Next, while stirring, 162.5 g of 80% AA, 7.5 g of 48% NaOH, 150.0 g of 40% HAPS, 10.0 g of Monomer 5, 42.1 g of 15% NaPS and 48.1 g of 35% SBS were added dropwise from separate nozzles to the polymerization reaction system maintained at 90° C. Dropwise addition times for the respective solutions were 180 min for 80% AA and 48% NaOH, 120 min for 40% HAPS and Monomer 5, 185 min for 15% NaPS and 175 min for 35% SBS. The dropwise addition rate for the various solutions was constant, and dropwise addition of the various solutions was performed continuously.

After completion of the 80% AA dropwise addition, the above reaction solution was maintained (cured) at 90° C. for another 30 min, and polymerization was completed. After completion of polymerization, while stirring and allowing the polymerization reaction solution to cool, 120.4 g of 48% NaOH were added dropwise slowly, and the polymerization reaction solution was neutralized.

In this manner, an aqueous solution (Polymer Composition 6) of 14,000 weight-average molecular weight Polymer 6 (sulfonate group-containing Copolymer 6) of 44.8% solids concentration was obtained.

Ether Bond-Containing Monomer Synthesis
Example 6

To a glass separable flask of 500-mL volume equipped with a stirrer (paddle fins), 61.2 g of New cole 1004 (made by Nippon Nyukazai Co., Ltd.; 4 mol ethylene oxide adduct of 2-ethylhexyl alcohol) and 16.8 g of KOH were added. Nitrogen gas was blown in and, while stirring, the temperature was raised to 120° C. By maintaining this state for 1 h, the reaction system was dehydrated. Next, a reflux condenser was attached. The temperature was reduced to 60° C. 27.0 g of MLC were added over 30 min and then reacted for 5 h. 200.0 g of pure water were added to this and, after reacting for 1 h, [the mixture] was neutralized with sulfuric acid. After cooling to room temperature, this aqueous solution was transferred to a 500-mL separatory funnel, left standing until the layers separated, and the lower layer was removed. The remaining upper layer was transferred to a 300-mL Florence flask, and solvent was removed with a rotary evaporator. By removing deposited salts by filtration, Monomer 6 was obtained.

Application Example 7

To a glass separable flask of 1000-mL volume equipped with reflux condenser and stirrer (paddle fins), 54.0 g of pure water and 0.0121 g of Mohr's salt were added and, while stirring, the temperature was raised to 90° C., and [this] was used as the polymerization reaction system. Next, while stirring, 175.0 g of 80% AA, 8.1 g of 48% NaOH, 100.0 g of 40% HAPS, 20.0 g of Monomer 6, 43.6 g of 15% NaPS and 43.6 g of 35% SBS were added dropwise from separate nozzles to the polymerization reaction system maintained at 90° C. Dropwise addition times for the respective solutions were 180 min for 80% AA and 48% NaOH, 120 min for 40% HAPS and Monomer 6, 185 min for 15% NaPS and 175 min for 35% SBS. The dropwise addition rate for the various solutions was constant, and dropwise addition of the various solutions was performed continuously.

After completion of the 80% AA dropwise addition, the above reaction solution was maintained (cured) at 90° C. for another 30 min, and polymerization was completed. After completion of polymerization, while stirring and allowing the polymerization reaction solution to cool, 129.6 g of 48% NaOH were added dropwise slowly, and the polymerization reaction solution was neutralized.

In this manner, an aqueous solution (Polymer Composition 7) of 18,000 weight-average molecular weight Polymer 7 (sulfonate group-containing Copolymer 7) of 45.0% solids concentration was obtained.

Application Example 8

To a glass separable flask of 1000-mL volume equipped with reflux condenser and stirrer (paddle fins), 100.1 g of pure water and 12.0 g of Monomer 1 were added and, while stirring, the temperature was raised to 90° C., and [this] was used as the polymerization reaction system. Next, while stirring, 90.0 g of 80% AA, 90.0 g of 40% HAPS, and 31.7 g of 15% NaPS were added dropwise from separate nozzles to the polymerization reaction system maintained at 90° C. Dropwise addition times for the respective solutions were 90 min for 80% AA, 60 min for 40% HAPS, and 110 min for 15% NaPS. The dropwise addition rate for the various solutions was constant and dropwise addition of the various solutions was performed continuously.

After completion of the 80% AA dropwise addition, the above reaction solution was maintained (cured) at 90° C. for another 60 min, and polymerization was completed. After completion of polymerization, while stirring and allowing the polymerization reaction solution to cool, 70.8 g of 48% NaOH and 30.0 g of pure water were added dropwise slowly, and the polymerization reaction solution was neutralized and diluted.

In this manner, an aqueous solution (Polymer Composition 8) of 95,000 weight-average molecular weight Polymer 8 (sulfonate group-containing Copolymer 8) of 36.2% solids concentration was obtained.

Comparative Example 1

To an SUS separable flask of 2500-mL volume equipped with reflux condenser and stirrer (paddle fins), 125.0 g of pure water and 0.0220 g of Mohr's salt were added and, while stirring, the temperature was raised to 90° C., and [this] was used as the polymerization reaction system. Next, while stirring, 315.0 g of 80% AA, 180.0 g of 40% HAPS, 36.0 g of styrene (also called "St" below), 83.6 g of 15% NaPS and 71.6 g of 35% SBS were added dropwise from separate nozzles to the polymerization reaction system maintained at 90° C. Dropwise addition times for the respective solutions were 180 min for 80% AA, 150 min for 40% HAPS and St, 190 min for 15% NaPS and 175 min for 35% SBS. The dropwise addition rate for the various solutions was constant, and dropwise addition of the various solutions was performed continuously.

After completion of the 80% AA dropwise addition, the above reaction solution was maintained (cured) at 90° C. for another 30 min, and polymerization was completed. After completion of polymerization, while stirring and allowing the polymerization reaction solution to cool, 247.9 g of 48% NaOH were added dropwise slowly, and the polymerization reaction solution was neutralized. In this manner, an aqueous solution (Comparative Polymer Composition 1) of 14,000 weight-average molecular weight polymer (Comparative Polymer 1) of 44.8% solids concentration was obtained.

Comparative Example 2

To an SUS separable flask of 2500-mL volume equipped with reflux condenser and stirrer (paddle fins), 84.0 g of pure water and 0.0219 g of Mohr's salt were added and, while stirring, the temperature was raised to 90° C., and [this] was used as the polymerization reaction system. Next, while stirring, 315.0 g of 80% AA, 14.5 g of 48% NaOH, 225.0 g of 40% HAPS, 18.0 g of butyl acrylate (also called "BA" below), 81.1 g of 15% NaPS, and 69.5 g of 35% SBS were added dropwise from separate nozzles to the polymerization reaction system maintained at 90° C. Dropwise addition times for the respective solutions were 180 min for 80% AA and 48% NaOH, 150 min for 40% HAPS and BA, 190 min for 15% NaPS and 175 min for 35% SBS. The dropwise addition rate for the various solutions was constant, and dropwise addition of the various solutions was performed continuously.

After completion of the 80% AA dropwise addition, the above reaction solution was maintained (cured) at 90° C. for another 30 min, and polymerization was completed. After completion of polymerization, while stirring and allowing the polymerization reaction solution to cool, 233.3 g of 48% NaOH were added dropwise slowly, and the polymerization reaction solution was neutralized.

In this manner, an aqueous solution (Comparative Polymer Composition 2) of 7500 weight-average molecular weight polymer (Comparative Polymer 2) of 44.5% solids concentration was obtained.

Application Example 9

In Application Example 9, deposition-inhibiting abilities of the polymers obtained in Application Examples 1-7, and Comparative Examples 1 and 2 were evaluated using the above methods. The results are summarized in Table 1.

TABLE 1

|  | Carbon Number of Hydrophilic Group | Mass % of structural units (a)/structural units (b)/structural units (c) | Solids % | Molecular Weight (Mw/Mn) | Deposition-Inhibiting Ability |
|---|---|---|---|---|---|
| Application Example 1 | 12 | 5/80/15 | 44.9 | 12000/7700 | 83 |
| Application Example 2 | 12 | 15/75/15 | 45.0 | 19000/9600 | 86 |
| Application Example 3 | 4 | 10/60/30 | 44.8 | 15000/8600 | 78 |
| Application Example 4 | 8 | 10/60/30 | 44.7 | 16000/9000 | 81 |
| Application Example 5 | 4 | 20/70/10 | 44.8 | 16000/8800 | 77 |
| Application Example 6 | 12 | 5/65/30 | 44.8 | 14000/8100 | 84 |
| Application Example 7 | 8 | 10/70/20 | 45.0 | 18000/9500 | 80 |
| Application Example 1 | 6 | None (but St 10)/70/20 | 44.8 | 14000/8500 | 68 |
| Application Example 2 | 4 | None (but BA 5)/70/25 | 44.5 | 7500/4100 | 72 |

As is clear from Table 1, the polymer compositions of the present invention have significantly superior deposition-inhibiting ability compared to the comparative polymer compositions that comprise comparative polymers that do not comprise ether bond-monomers for the hydrophobic monomer.

Composition Formulations

Granular Laundry Detergent Example 10

| Formula | A wt % | B wt % | C wt % | D wt % | E wt % |
|---|---|---|---|---|---|
| $C_{11-12}$ Linear alkyl benzene sulphonate | 13-25 | 13-25 | 13-25 | 13-25 | 9-25 |
| $C_{12-18}$ Ethoxylate Sulfate | — | — | 0-3 | — | 0-1 |
| $C_{14-15}$ alkyl ethoxylate (EO = 7) | 0-3 | 0-3 | — | 0-5 | 0-3 |
| Dimethyl hydroxyethyl lauryl ammonium chloride | — | — | 0-2 | 0-2 | 0-2 |
| $C_{8-10}-\underset{\underset{CH_3}{\mid}}{\overset{\overset{CH_3}{\mid}}{N^+}}-(CH_2CH_2)OH$ | 20-40 | — | 18-33 | 12-22 | 0-15 |
| Sodium tripolyphosphate K1 |  |  |  |  |  |
| Zeolite | 0-10 | 20-40 | 0-3 | — | — |
| Silicate builder | 0-10 | 0-10 | 0-10 | 0-10 | 0-10 |

-continued

| Formula | A wt % | B wt % | C wt % | D wt % | E wt % |
|---|---|---|---|---|---|
| Carbonate | 0-30 | 0-30 | 0-30 | 5-25 | 0-20 |
| Diethylene triamine penta acetate | 0-1 | 0-1 | 0-1 | 0-1 | 0-1 |
| Polyacrylate | 0-3 | 0-3 | 0-3 | 0-3 | 0-3 |
| Carboxy Methyl Cellulose | 0.2-0.8 | 0.2-0.8 | 0.2-0.8 | 0.2-0.8 | 0.2-0.8 |
| Copolymer[1] | 1-20 | 1-20 | 5.0 | 10 | 2.5 |
| Percarbonate | 0-10 | 0-10 | 0-10 | 0-10 | 0-10 |
| Nonanoyloxybenzenesulfonate | — | — | 0-2 | 0-2 | 0-2 |
| Tetraacetylethylenediamine | — | — | 0-0.6 | 0-0.6 | 0-0.6 |
| Zinc Phthalocyanine Tetrasulfonate | — | — | 0-0.005 | 0-0.005 | 0-0.005 |
| Brightener | 0.05-0.2 | 0.05-0.2 | 0.05-0.2 | 0.05-0.2 | 0.05-0.2 |
| $MgSO_4$ | — | — | 0-0.5 | 0-0.5 | 0-0.5 |
| Enzymes | 0-0.5 | 0-0.5 | 0-0.5 | 0-0.5 | 0-0.5 |
| Minors (perfume, dyes, suds stabilizers) | balance | balance | balance | balance | balance |

[1] A copolymer according to any of Application Examples 1, 2, 3, 4, 5, 6, 7 or 8.

Granular Laundry Detergent Example 11

Aqueous Slurry Composition

| Component | % w/w Aqueous slurry |
|---|---|
| A compound having the following general structure: bis(($C_2H_5O$)($C_2H_4O$)n)($CH_3$)—$N^+$—$C_xH_{2x}$—$N^+$—($CH_3$)—bis(($C_2H_5O$)($C_2H_4O$)n), wherein n = from 20 to 30, and x = from 3 to 8, or sulphated or sulphonated variants thereof | 1.23 |
| Ethylenediamine disuccinic acid | 0.35 |
| Brightener | 0.12 |
| Magnesium sulphate | 0.72 |
| Acrylate/maleate copolymer | 6.45 |
| Copolymer[1] | 1.60 |
| Linear alkyl benzene sulphonate | 11.92 |
| Hydroxyethane di(methylene phosphonic acid) | 0.32 |
| Sodium carbonate | 4.32 |
| Sodium sulphate | 47.49 |
| Soap | 0.78 |
| Water | 24.29 |
| Miscellaneous | 0.42 |
| Total Parts | 100.00 |

[1] A copolymer or any mixture of copolymers according to any of Application Examples 1, 2, 3, 4, 5, 6, 7 or 8.

Preparation of a Spray-Dried Powder.

An aqueous slurry having the composition as described above is prepared having a moisture content of 25.89%. The aqueous slurry is heated to 72° C. and pumped under high pressure (from $5.5 \times 10^6 Nm^{-2}$ to $6.0 \times 10^6 Nm^{-2}$), into a counter current spray-drying tower with an air inlet temperature of from 270° C. to 300° C. The aqueous slurry is atomised and the atomised slurry is dried to produce a solid mixture, which is then cooled and sieved to remove oversize material (>1.8 mm) to form a spray-dried powder, which is free-flowing. Fine material (<0.15 mm) is elutriated with the exhaust the exhaust air in the spray-drying tower and collected in a post tower containment system. The spray-dried powder has a moisture content of 1.0 wt %, a bulk density of 427 g/l and a particle size distribution such that 95.2 wt % of the spray-dried powder has a particle size of from 150 to 710 micrometers. The composition of the spray-dried powder is given below.

Spray-Dried Powder Composition.

| Component | % w/w Spray-dried powder |
|---|---|
| A compound having the following general structure: bis(($C_2H_5O$)($C_2H_4O$)n)($CH_3$)—$N^+$—$C_xH_{2x}$—$N^+$—($CH_3$)—bis(($C_2H_5O$)($C_2H_4O$)n), wherein n = from 20 to 30, and x = from 3 to 8, or sulphated or sulphonated variants thereof | 1.62 |
| Ethylenediamine disuccinic acid | 0.46 |
| Brightener | 0.16 |
| Magnesium sulphate | 0.95 |
| Acrylate/maleate copolymer | 8.45 |
| Copolymer[1] | 2.09 |
| Linear alkyl benzene sulphonate | 15.65 |
| Hydroxyethane di(methylene phosphonic acid) | 0.42 |
| Sodium carbonate | 5.65 |
| Sodium sulphate | 61.98 |
| Soap | 1.02 |
| Water | 1.00 |
| Miscellaneous | 0.55 |
| Total Parts | 100.00 |

[1] A copolymer or any mixture of copolymers according to any of Application Examples 1, 2, 3, 4, 5, 6, 7 or 8.

Preparation of an Anionic Surfactant Particle 1

The anionic detersive surfactant particle 1 is made on a 520 g batch basis using a Tilt-A-Pin then Tilt-A-Plow mixer (both made by Processall). 108 g sodium sulphate supplied is added to the Tilt-A-Pin mixer along with 244 g sodium carbonate. 168 g of 70% active $C_{25}E_3S$ paste (sodium ethoxy sulphate based on $C_{12/15}$ alcohol and ethylene oxide) is added to the Tilt-A-Pin mixer. The components are then mixed at 1200 rpm for 10 seconds. The resulting powder is then transferred into a Tilt-A-Plow mixer and mixed at 200 rpm for 2 minutes to form particles. The particles are then dried in a fluid bed dryer at a rate of 2500 l/min at 120° C. until the equilibrium relative humidity of the particles is less than 15%. The dried particles are then sieved and the fraction through 1180 μm and on 250 μm is retained The composition of the anionic detersive surfactant particle 1 is as follows: 25.0% w/w $C_{25}E_3S$ sodium ethoxy sulphate 18.0% w/w sodium sulphate 57.0% w/w sodium carbonate Preparation of a Cationic Detersive Surfactant Particle 1

The cationic surfactant particle 1 is made on a 14.6 kg batch basis on a Morton FM-50 Loedige mixer. 4.5 kg of micronised sodium sulphate and 4.5 kg micronised sodium carbonate are premixed in the Morton FM-50 Loedige mixer. 4.6 kg of 40% active mono-$C_{12-14}$ alkyl mono-hydroxyethyl di-methyl quaternary ammonium chloride (cationic surfactant) aqueous solution is added to the Morton FM-50 Loedige-mixer whilst both the main drive and the chopper are operating. After approximately two minutes of mixing, a 1.0 kg 1:1 weight ratio mix of micronised sodium sulphate and micronised sodium carbonate is added to the mixer. The resulting agglomerate is collected and dried using a fluid bed dryer on a basis of 2500l/min air at 100-140° C. for 30 minutes. The resulting powder is sieved and the fraction through 1400 µm is collected as the cationic surfactant particle 1. The composition of the cationic surfactant particle 1 is as follows:

15% w/w mono-$C_{12-14}$ alkyl mono-hydroxyethyl di-methyl quaternary ammonium chloride 40.76% w/w sodium carbonate 40.76% w/w sodium sulphate 3.48% w/w moisture and miscellaneous Preparation of a Granular Laundry Detergent Composition 10.84 kg of the spray-dried powder of example 6, 4.76 kg of the anionic detersive surfactant particle 1, 1.57 kg of the cationic detersive surfactant particle 1 and 7.83 kg (total amount) of other individually dosed dry-added material are dosed into a 1 m diameter concrete batch mixer operating at 24 rpm. Once all of the materials are dosed into the mixer, the mixture is mixed for 5 minutes to form a granular laundry detergent composition. The formulation of the granular laundry detergent composition is described below:

A Granular Laundry Detergent Composition

| Component | % w/w granular laundry detergent composition |
|---|---|
| Spray-dried powder from earlier table in Example 5 | 43.34 |
| 91.6 wt % active linear alkyl benzene sulphonate flake supplied by Stepan under the tradename Nacconol 90G ® | 0.22 |
| Citric acid | 5.00 |
| Sodium percarbonate (having from 12% to 15% active AvOx) | 14.70 |
| Photobleach particle | 0.01 |
| Lipase (11.00 mg active/g) | 0.70 |
| Amylase (21.55 mg active/g) | 0.33 |
| Protease (56.00 mg active/g) | 0.43 |
| Tetraacetyl ethylene diamine agglomerate (92 wt % active) | 4.35 |
| Suds suppressor agglomerate (11.5 wt % active) | 0.87 |
| Acrylate/maleate copolymer particle (95.7 wt % active) | 0.29 |
| Green/Blue carbonate speckle | 0.50 |
| Anionic detersive surfactant particle 1 | 19.04 |
| Cationic detersive surfactant particle 1 | 6.27 |
| Sodium sulphate | 3.32 |
| Solid perfume particle | 0.63 |
| Total Parts | 100.00 |

Liquid Laundry Detergents Example 12

| Ingredient | A wt % | B wt % | C wt % | D wt % | E wt % |
|---|---|---|---|---|---|
| Sodium alkyl ether sulfate | 14.4% | | 9.2% | 5.4% | |
| Linear alkylbenzene sulfonic acid | 4.4% | 12.2% | 5.7% | 1.3% | |
| Alkyl ethoxylate | 2.2% | 8.8% | 8.1% | 3.4% | |
| Amine oxide | 0.7% | 1.5% | | | |
| Citric acid | 2.0% | 3.4% | 1.9% | 1.0% | 1.6% |
| Fatty acid | 3.0% | 8.3% | | | 16.0% |
| Protease | 1.0% | 0.7% | 1.0% | | 2.5% |
| Amylase | 0.2% | 0.2% | | | 0.3% |
| Borax | 1.5% | 2.4% | 2.9% | | |
| Calcium and sodium formate | 0.2% | | | | |
| Formic acid | | | | | 1.1% |
| Copolymer[1] | 1.8% | 2.1% | | | 3.2% |
| Sodium polyacrylate | | | | 0.2% | |
| Sodium polyacrylate copolymer | | | 0.6% | | |
| Fluorescent whitening agent | 0.15% | 0.2% | 0.12% | 0.12% | 0.2% |
| Ethanol | 2.5% | 1.4% | 1.5% | | |
| Propanediol | 6.6% | 4.9% | 4.0% | | 15.7% |
| Sorbitol | | | 4.0% | | |
| Ethanolamine | 1.5% | 0.8% | 0.1% | | 11.0% |
| Sodium hydroxide | 3.0% | 4.9% | 1.9% | 1.0% | |
| Sodium cumene sulfonate | | 2.0% | | | |
| Silicone suds suppressor | | 0.01% | | | |
| Perfume | 0.3% | 0.7% | 0.3% | 0.4% | 0.6% |
| Opacifier[5] | | 0.30% | 0.20% | | 0.50% |
| Water | balance | balance | balance | balance | balance |
| | 100.0% | 100.0% | 100.0% | 100.0% | 100.0% |

[1]A copolymer or any mixture of copolymers according to any of Application Examples 1, 2, 3, 4, 5, 6, 7 or 8.
[2]diethylenetriaminepentaacetic acid, sodium salt
[3]diethylenetriaminepentakismethylenephosphonic acid, sodium salt
[4]ethylenediaminetetraacetic acid, sodium salt
[5]Acusol OP 301

| Ingredient | F wt % | G wt % | H wt % | I wt % | J wt % | K wt % |
|---|---|---|---|---|---|---|
| Alkylbenzene sulfonic acid | 7 | 7 | 4.5 | 1.2 | 1.5 | 12.5 |
| Sodium C12-14 alkyl ethoxy 3 sulfate | 2.3 | 2.3 | 4.5 | 4.5 | 7 | 18 |
| C14-15 alkyl 8-ethoxylate | 5 | 5 | 2.5 | 2.6 | 4.5 | 4 |
| C12 alkyl dimethyl amine oxide | — | 2 | — | — | — | — |
| C12-14 alkyl hydroxyethyl dimethyl ammonium chloride | — | — | — | 0.5 | — | — |
| C12-18 Fatty acid | 2.6 | 3 | 4 | 2.6 | 2.8 | 11 |
| Citric acid | 2.6 | 2 | 1.5 | 2 | 2.5 | 3.5 |
| Protease enzyme | 0.5 | 0.5 | 0.6 | 0.3 | 0.5 | 2 |
| Amylase enzyme | 0.1 | 0.1 | 0.15 | — | 0.05 | 0.5 |
| Mannanase enzyme | 0.05 | — | 0.05 | — | — | 0.1 |
| Copolymer[1] | 1.0 | .8 | 1 | 0.4 | 1.5 | 2.7 |
| Hydroxyethane diphosphonic acid | — | — | 0.45 | — | — | 1.5 |
| FWA | 0.1 | 0.1 | 0.1 | — | — | 0.2 |
| Solvents (1,2 propanediol, ethanol), stabilizers | 3 | 4 | 1.5 | 1.5 | 2 | 4.3 |
| Hydrogenated castor oil derivative structurant | 0.4 | 0.3 | 0.3 | 0.1 | 0.3 | — |
| Boric acid | 1.5 | 2 | 2 | 1.5 | 1.5 | 0.5 |
| Na formate | — | — | — | 1 | — | — |
| Reversible protease inhibitor[3] | — | — | 0.002 | — | — | — |
| Perfume | 0.5 | 0.7 | 0.5 | 0.5 | 0.8 | 1.5 |
| Buffers (sodium hydroxide, Monoethanolamine) | | | To pH 8.2 | | | |
| Water and minors (antifoam, aesthetics, . . . ) | | | To 100 | | | |

[1]The copolymer or any mixture of copolymers according to any of Application Examples 1, 2, 3, 4, 5, 6, 7 or 8.

| Ingredient | L wt % | M wt % | N wt % | O wt % | P wt % | Q wt % |
|---|---|---|---|---|---|---|
| Alkylbenzene sulfonic acid | 5.5 | 2.7 | 2.2 | 12.2 | 5.2 | 5.2 |
| Sodium C12-14 alkyl ethoxy 3 sulfate | 16.5 | 20 | 9.5 | 7.7 | 1.8 | 1.8 |
| Sodium C12-14 alkyl sulfate | 8.9 | 6.5 | 2.9 | — | — | — |
| C12-14 alkyl 7-ethoxylate | — | — | — | — | 0.15 | 0.15 |
| C14-15 alkyl 8-ethoxylate | — | — | — | — | 3.5 | 3.5 |
| C12-15 alkyl 9-ethoxylate | 1.7 | 0.8 | 0.3 | 18.1 | — | — |
| C12-18 Fatty acid | 2.2 | 2.0 | — | 1.3 | 2.6 | 2.6 |
| Citric acid | 3.5 | 3.8 | 2.2 | 2.4 | 2.5 | 2.5 |
| Protease enzyme | 1.7 | 1.4 | 0.4 | — | 0.5 | 0.5 |
| Amylase enzyme | 0.4 | 0.3 | — | — | 0.1 | 0.1 |
| Mannanase enzyme | — | — | — | — | 0.04 | 0.04 |
| Copolymer[1] | 2.1 | 1.2 | 1.0 | 2 | 1.00 | 0.25 |
| PEG-PVAc Polymer[2] | — | — | — | — | — | 0.3 |
| Ethoxysulfated Hexamethylene | — | — | — | — | — | 0.7 |

| Ingredient | L wt % | M wt % | N wt % | O wt % | P wt % | Q wt % |
|---|---|---|---|---|---|---|
| Diamine Dimethyl Quat | — | — | — | — | — | — |
| FWA | — | — | — | — | .04 | .04 |
| Solvents (1,2 propanediol, ethanol, stabilizers | 7 | 7.2 | 3.6 | 3.7 | 1.9 | 1.9 |
| Hydrogenated castor oil derivative structurant | 0.3 | 0.2 | 0.2 | 0.2 | 0.35 | 0.35 |
| Polyacrylate | — | — | — | 0.1 | — | — |
| Polyacrylate copolymer[3] | — | — | — | 0.5 | — | — |
| Sodium carbonate | — | — | — | 0.3 | — | — |
| Sodium silicate | — | — | — | — | — | — |
| Borax | 3 | 3 | 2 | 1.3 | — | — |
| Boric acid | 1.5 | 2 | 2 | 1.5 | 1.5 | 1.5 |
| Perfume | 0.5 | 0.5 | 0.5 | 0.8 | 0.5 | 0.5 |
| Buffers (sodium hydroxide, monoethanolamine) | | | | | 3.3 | 3.3 |
| Water, dyes and miscellaneous | | | Balance | | | |

[1]Copolymer or any mixture of copolymers according to any of Application Examples 1, 2, 3, 4, 5, 6, 7 or 8.
[2]PEG-PVA graft copolymer is a polyvinyl acetate grafted polyethylene oxide copolymer having a polyethylene oxide backbone and multiple polyvinyl acetate side chains. The molecular weight of the polyethylene oxide backbone is about 6000 and the weight ratio of the polyethylene oxide to polyvinyl acetate is about 40 to 60 and no more than 1 grafting point per 50 ethylene oxide units.
[3]Alco 725 (styrene/acrylate)

Liquid Dish Handwashing Detergents Example 13

| Composition | A | B |
|---|---|---|
| $C_{12-13}$ Natural AE0.6S | 29.0 | 29.0 |
| $C_{10-14}$ mid-branched Amine Oxide | — | 6.0 |
| $C_{12-14}$ Linear Amine Oxide | 6.0 | — |
| SAFOL ® 23 Amine Oxide | 1.0 | 1.0 |
| $C_{11}E_9$ Nonionic[2] | 2.0 | 2.0 |
| Ethanol | 4.5 | 4.5 |
| Copolymer[1] | 5.0 | 2.0 |
| Sodium cumene sulfonate | 1.6 | 1.6 |
| Polypropylene glycol 2000 | 0.8 | 0.8 |
| NaCl | 0.8 | 0.8 |
| 1,3 BAC Diamine[3] | 0.5 | 0.5 |
| Suds boosting polymer[4] | 0.2 | 0.2 |
| Water | Balance | Balance |

[1]A copolymer or any mixture of polymers according to any of Application Examples 1, 2, 3, 4, 5, 6, 7 or 8.
[2]Nonionic may be either $C_{11}$ Alkyl ethoxylated surfactant containing 9 ethoxy groups.
[3]1,3 BAC is 1,3 bis(methylamine)-cyclohexane.
[4](N,N-dimethylamino)ethyl methacrylate homopolymer

Automatic Dishwasher Detergents Example 14

| | A | B | C | D | E | F | G |
|---|---|---|---|---|---|---|---|
| Sodium tripolyphosphate | 0 | 6 | 10 | 0-20 | 0 | 0 | 0 |
| Silicate solids | 6 | 6 | 6 | 6-10 | 1.5-2.5 | 2.5-6 | 2.5-6 |
| Carbonate | 35 | 40 | 40 | 25-40 | | 25-40 | 25-40 |
| Sodium Bicarbonate | | | | | 5-15 | | |
| Xanthan gum | | | | | 0.5-1.0 | | |
| MGDA | | | | | 4.0-7.5 | 4-7 | 2-4 |
| HEDP | | | | | | 0.05-0.3 | 0.05-0.3 |
| Nonionic surfactant[1] | 0 | 0 | 0 | 0.5-5 | 0.5-5 | 0.5-1.0 | 0.5-1.0 |
| Polymer dispersant[2] | | 0.5 | 5 | 6 | 5 | 0.1-2.0 | 0.1-2.0 |
| Polymer dispersant[3] | | | | | 0.5-3.0 | | |
| Copolymer[4] | 0.05-10 | 1 | 2.5 | 5 | 6-8 | 4-6 | 2-3 |
| Enzymes | 0.3-0.8 | 0.3-0.8 | 0.3-0.8 | 0.3-0.8 | 0.5-1.0 | 0.25-0.6 | 0.25-0.6 |
| Bleach and bleach activators | 4 | 4 | 4 | 4 | 0 | 2.0-4.0 | 2.0-4.0 |

-continued

|  | A | B | C | D | E | F | G |
|---|---|---|---|---|---|---|---|
| Disodium citrate dihydrate | 0 | 0 | 0 | 2-20 | 0 | 0 | 0 |
| Sodium Sulfate | 30-50 | 30-50 | 30-50 | 30-50 | 0 | 30-50 | 30-50 |
| Perfume | 0.01-0.1 | 0.01-0.1 | 0.01-0.1 | 0.01-0.1 | 0.01-0.1 | 0.01-0.1 | 0.01-0.1 |
| Water, dye and other adjuncts | Balance to 100% | Balance to 100% | Balance to 100% | Balance to 100% | Balance to 100% | Balance to 100% | Balance to 100% |

[1] Such as SLF-18 POLY TERGENT from the BASF Corporation.
[2] Copolymer such as ACUSOL ® 445N from Rohm & Haas or ALCOSPERSE ® 725 from Alco.
[3] Ethoxylated cationic diame such as those disclosed in U.S. Pat. No. 4,659,802.
[4] A copolymer or any mixture of copolymers according to any of Application Examples 1, 2, 3, 4, 5, 6, 7 or 8.

| Example | A |
|---|---|
| Particulate composition | |
| STPP | 0 |
| Silicate | 2-8 |
| Carbonate | 25-50 |
| Copolymer[1] | 5-10 |
| Polymer Dispersant[2] | 1-5 |
| Nonionic Surfactant[3] | 1-5 |
| Enzyme | 1-6 |
| Bleach and Bleach Activators | 2.5-10 |
| Perfume | 0.05-1 |
| Sodium Sulfate | 0-10 |
| Liquid composition | |
| DPG | 40-50 |
| Nonionic Surfactant[3] | 40-50 |
| Neodol C11E9 | 0-5.0 |
| Glycerine | 0-5.0 |
| Dye | 0.1-1.0 |

[1] A copolymer or any mixture of copolymers according to any of Application Examples 1, 2, 3, 4, 5, 6, 7 or 8.
[2] Copolymer such as ACUSOL ® 445N from Rohm & Haas or ALCOSPERSE ® 725 from Alco.
[3] Such as SLF-18 POLY TERGENT from the BASF Corporation.

The invention claimed is:

1. A laundry detergent or cleaning composition which comprises a surfactant system and a copolymer containing sulfonate groups comprising from 1 to 50 mass percent of structural units (a) derived from 1 or more kinds of monomers (A) selected from ether bond-containing monomers represented by Formulas (1) or (2) below,

[Structure 1]

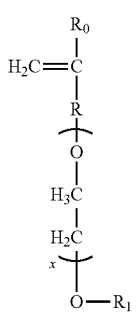

General Formula (1)

in Formula (1) above, Ro represents a hydrogen atom or $CH_3$ group, R represents a $CH_2$ group, $CH_2CH_2$ group or single bond, X represents a number 0-5 (provided X represents a number 1-5 when R is a single bond), and $R_1$ is a hydrogen atom or 1- to 20-carbon organic group,

[Structure 2]

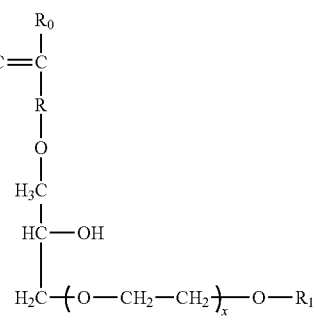

General Formula (2)

in Formula (2) above, Ro represents a hydrogen atom or $CH_3$ group, R represents a $CH_2$ group, $CH_2CH_2$ group or single bond, X represents a number 0-5, and $R_1$ is a hydrogen atom or 1- to 20-carbon organic group, 50 mass % or more and less than 98 mass % of structural units (b) derived from carboxyl group-containing monomers (B), wherein the carboxyl group-containing monomer (B) is acrylic acid or an acrylate salt, and 1 mass % or more and less than 50 mass % of structural units (c) derived from sulfonate group-containing monomers (C) as requisite constituent units.

2. A laundry detergent or cleaning composition according to claim 1 wherein the laundry detergent or cleaning composition is selected from the group consisting of liquid laundry detergent compositions, solid laundry detergent compositions, hard surface cleaning compositions, liquid hand dishwashing compositions, solid automatic dishwashing compositions, liquid automatic dishwashing, and tab/unit dose form automatic dishwashing compositions.

3. A laundry detergent or cleaning composition according to claim 1 wherein the detergent or cleaning composition comprises from about 1% to about 20% by weight of the detergent or cleaning composition, of the hydrophobic group-containing copolymer composition.

4. A laundry detergent or cleaning composition according to claim 1 wherein the surfactant system comprises $C_{10}$-$C_{15}$ alkyl benzene sulfonates.

5. A laundry detergent or cleaning composition according to claim 1 wherein the surfactant system comprises $C_8$-$C_{18}$ linear alkyl sulfonate surfactant.

6. A laundry detergent or cleaning composition according claim 1 wherein the surfactant system further comprises one or more co-surfactant selected from the groups consisting of nonionic surfactants, cationic surfactants, anionic surfactants and mixtures thereof.

7. A laundry detergent or cleaning composition according to claim 1 wherein the detergent or composition further comprises cleaning adjunct additives selected from the group consisting of, enzymes, alkali builders, chelant builders, bleaches, bleaching assisting agents, perfumes, defoaming agents, bactericides, corrosion inhibitors, and mixtures thereof.

8. A cleaning implement comprising a nonwoven substrate and the laundry detergent or cleaning composition according to claim 1.

* * * * *